(12) United States Patent
Wang et al.

(10) Patent No.: US 6,904,200 B2
(45) Date of Patent: Jun. 7, 2005

(54) MULTIDIMENSIONAL OPTICAL GRATINGS

(75) Inventors: David W. Wang, Saratoga, CA (US); John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 320 days.

(21) Appl. No.: 10/007,890

(22) Filed: Nov. 9, 2001

(65) Prior Publication Data

US 2004/0223693 A1 Nov. 11, 2004

Related U.S. Application Data

(63) Continuation-in-part of application No. 09/953,468, filed on Sep. 14, 2001.

(51) Int. Cl.[7] .................................................. G02B 6/34
(52) U.S. Cl. ...................................................... 385/37
(58) Field of Search ............................. 385/37; 359/566, 359/568–576

(56) References Cited

U.S. PATENT DOCUMENTS

| | | |
|---|---|---|
| 4,474,427 A | 10/1984 | Hill et al. |
| 4,725,110 A | 2/1988 | Glenn et al. |
| 4,807,950 A | 2/1989 | Glenn et al. |
| 5,042,897 A | 8/1991 | Meltz et al. |
| 5,048,913 A | 9/1991 | Glenn et al. |
| 5,061,032 A | 10/1991 | Meltz et al. |
| 5,104,209 A | 4/1992 | Hill et al. |
| 5,216,739 A | 6/1993 | Hill et al. |
| 5,367,588 A | 11/1994 | Hill et al. |
| 5,388,173 A | 2/1995 | Glenn |
| 5,495,548 A | 2/1996 | Bilodeau et al. |
| 5,652,818 A | 7/1997 | Byron |
| 5,726,805 A | 3/1998 | Kaushik et al. ............. 359/589 |
| 5,822,479 A | 10/1998 | Napier et al. |
| 5,898,804 A | 4/1999 | Wickham |
| 6,084,998 A | 7/2000 | Straayer |
| 6,169,831 B1 | 1/2001 | Adams et al. |
| 6,212,312 B1 * | 4/2001 | Grann et al. .................. 385/24 |
| 6,404,947 B1 * | 6/2002 | Matsuda ....................... 385/24 |
| 2002/0070352 A1 * | 6/2002 | Allan et al. .............. 250/492.1 |

FOREIGN PATENT DOCUMENTS

EP        1028504 A1 *  8/2000   ............. H01S/5/12

OTHER PUBLICATIONS

"Fiber gratings: vendors braced for the ramp–up,", Apr. 2001, vol. 2 No. 3, *FiberSystems International*, pp. 53, 54, 56 (3 pages).

* cited by examiner

*Primary Examiner*—Akm Enayet Ullah
*Assistant Examiner*—Michelle R. Connelly-Cushwa
(74) *Attorney, Agent, or Firm*—Raymond E. Roberts; IPLO Intellectual Property Law Offices

(57) ABSTRACT

Multi-dimensional optical gratings (600, 700) of a background material (602, 702, 802) having a first refractive index and cells (604, 704, 804) of at least one different refractive index. The cells (604, 704, 804) may occupy two-dimensional or three-dimensional grids, defining the optical gratings as planar gratings (600) or cubical gratings (700), and thus providing two or three sets of surface-to-surface separations, or thicknesses, and cell-to-cell separations. The respective sets of surface-to-surface separations and cell-to-cell separations used may particularly be selected according to Bragg's law to selectively scatter respective light wavelengths.

22 Claims, 19 Drawing Sheets

--- 884 ($\lambda_1$)
—·— 886 ($\lambda_2$)
——— 888 ($\lambda_3$)

MULTIDIMENSIONAL OPTICAL GRATINGS

CROSS-REFERENCE TO RELATED APPLICATIONS

This is a continuation-in-part of application Ser. No. 09/953,468, filed Sep. 14, 2001.

TECHNICAL FIELD

The present invention relates generally to optical gratings and more particularly to new forms of such gratings capable of diffracting one or more light wavelengths concurrently.

BACKGROUND ART

Optical technology is progressing rapidly. Growing needs, particularly in the telecommunications industry, are driving this progress and there is currently a major impetus to improve existing optical systems and to develop new ones. Unfortunately, several major components still are not completely meeting manufacturing yield, field reliability, and operating capacity requirements. These failings have resulted in high costs in existing systems and are limiting the adoption of future systems. One such component is the optical grating.

FIG. 1a–b (background art) depict two variations of traditional gratings. As can be seen, the shape of the groove can vary. FIG. 1a shows square steps and FIG. 1b shows blazed triangles, but other shapes are also possible, e.g., sinusoidal shaped grooves, and the physics is essentially the same.

Such "traditional gratings" were initially made of glass with grooves, and a few are still produced in this manner today. This, however, has a number of disadvantages. For instance, the density of the grooves is limited by the capability of the ruling engine, and the quality of the grooves produced tends to decrease as elements of the ruling engine wear from usage. Production of this type of gratings is time consuming and difficult, and the cost of such gratings is therefore high.

Molded and holographic gratings were invented later on, and their production cost is significantly lower than for glass gratings. Unfortunately, although suitable for many applications, these gratings tend to deteriorate in harsh environments. For example, in fiber optic communications, all optical components must operate for long periods of time in temperatures ranging from sub-zero to over eighty degrees Centigrade, and in humidity ranging from zero to 100 percent (see e.g., GR-468-CORE, Generic Reliability Assurance Requirements for Optoelectronic Devices Used In Telecommunications Equipment).

As can also be seen in FIG. 1a–b, traditional gratings have the property that light has to shine on the grating surface from above. This limits the useful diffraction effect of such gratings to only one dimension, and multiple units need to be assembled if multiple dimensions (axes of direction) are required.

One example of an application where the need to work with multiple wavelengths and axes is common, and growing, is wavelength division multiplexing and de-multiplexing (collectively, WDM) in fiber optic communications. The use of traditional gratings in WDM usually requires either adhesives or mechanical fixtures to keep the assembly intact. Alignment is also needed to make sure that the gratings diffract light in the proper directions. The resulting assemblies formed with such traditional gratings thus tend to be significantly larger than the optical fibers being worked with and mechanical connectors are needed for connection. All of these considerations, and others, increase the cost in a fiber optic communications system.

A relatively recent invention is the fiber Bragg grating. The fiber Bragg grating is a periodic perturbation in the refractive index which runs lengthwise in the core of a fiber waveguide. Based on the grating period, a Bragg grating reflects light within a narrow spectral band and transmits all other wavelengths which are present but outside that band. This makes Bragg gratings useful for light signal redirection, and they are now being widely used in WDM.

The typical fiber Bragg grating today is a germanium-doped optical fiber that has been exposed to ultraviolet (UV) light under a phase shift mask or grating pattern. The unmasked doped sections undergo a permanent change to a slightly higher refractive index after such exposure, resulting in an interlayer or a grating having two alternating different refractive indices. This permits characteristic and useful partial reflection to then occur when a laser beam transmits through each interlayer. The reflected beam portions form a constructive interference pattern if the period of the exposed grating meets the condition:

$$2*\Lambda*n_{eff}=\lambda$$

where $\Lambda$ is the grating spacing, $n_{eff}$ is the effective index of refraction between the unchanged and the changed indices, and $\lambda$ is the laser light wavelength.

FIG. 2 (background art) shows the structure of a conventional fiber Bragg grating 1 according to the prior art. A grating region 2 includes an interlayer 3 having two periodically alternating different refractive indices. As a laser beam 4 passes through the interlayer 3 partial reflection occurs, in the characteristic manner described above, forming a reflected beam 5 and a passed beam 6. The reflected beam 5 thus produced will include a narrow range of wavelengths. For example, if the reflected beam 5 is that being worked with in an application, this separated narrow band of wavelengths may carry data which has been superimposed by modulation. The reflected beam 5 is stylistically shown in FIG. 2 as a plurality of parts with incidence angles purposely skewed to distinguish the reflected beam 5 from the laser beam 4. Since the reflected beam 5 is merely directed back in the direction of the original laser beam 4, additional structure is usually also needed to separate it for actual use.

Unfortunately, as already noted, conventional fiber Bragg gratings and the processes used to make them have a number of problems which it is desirable to overcome. For example, the fibers usually have to be exposed one-by-one, severely limiting mass-production. Specialized handling during manufacturing is generally necessary because the dosage of the UV exposure determines the quality of the grating produced. The orientation of the fiber is also critical, and best results are achieved when the fiber is oriented in exactly the same direction as the phase shift mask. The desired period of the Bragg grating will be deviated from if the fiber is not precisely aligned, and accomplishing this, in turn, introduces mechanical problems. Thus, merely the way that the fiber work piece is held during manufacturing may produce stresses that can cause birefringes to form in the fiber and reduce the efficiency of the end product grating.

Once in use, conventional fiber Bragg gratings may again require special handling. The thermal expansion coefficient of the base optical fiber is often significant enough that changing environmental conditions can cause the fiber to either expand or shrink to the extent that the period of the grating and its center wavelength shift.

From the preceding discussion of traditional and fiber Bragg gratings it can be appreciated that there is a need for optical gratings which are better suited to the growing range of grating applications.

Accordingly, it is an object of the present invention to provide optical gratings which are improved with respect to the basic ease of use and range of potential uses, and to robustness and reliability once in use.

Briefly, one preferred embodiment of the present invention is an optical grating with a background region of a first material, having a first refractive index, and a grid of cells within the background region. The cells are of a second material having a second refractive index. A plurality of the cells each have at least one incident surface, and also each have opposed surfaces respective to the incident surfaces. The incident surfaces are pitched such that, when the optical grating receives a light beam, first portions thereof may strike the incident surfaces, enter the cell, travel to the opposed surfaces, be reflected there from, travel back to the incident surfaces, and exit the cell as refracted beams. The grid of cells is thus optically two-dimensional by virtue of the cells having at least two of cell-to-cell and surface-to-surface optical separations such that the reflected beams will constructively interfere for a pre-determined light wavelength when it is present in the light beam. Optionally, the grid of cells may be extended from two dimensions into a three dimensional grid or lattice of the cells.

An advantage of the present invention is that it provides improved processes to manufacture a variety of optical gratings, particularly including optical gratings able to employ Brat the Bragg effect in multiple dimensions and for up to one light wavelength per such dimension. Thus, for instance a three-dimension or cubical grating according to the present invention may separate light of one, two, or three different wavelengths (or wavelength ranges if "chirping" is also used).

Another advantage of the invention is that it separates such light wavelengths in a more useful way then prior art systems, particularly being able to direct separated narrow-band light wavelengths perpendicular to the paths of the entering beam and any exiting beam of non-separated wavelengths. Furthermore, when multiple light wavelengths are separated, their beams are inherently also widely separated apart.

Another advantage of the invention is that it may employ already well known and widely used manufacturing processes and materials, adopted from conventional electronic semiconductor integrated circuit (IC) and micro electro-mechanical system (MEMS) manufacturing. Highly desirable attributes of such processes may thus be imparted to the inventive processes and the products produced there with, including mass automated manufacturing, rigorous quality control, high yields, and low cost.

Another advantage of the invention, coincident with the above advantage, is that the invention is integratable directly into products by conventional IC and MEMS manufacturing processes. Notable also in this regard, the invention may be constructed of similar size to the devices it may typically be integrated with, and thus avoid the problems attendant with providing and using connectors, adapters, etc.

Another advantage of the invention is that it does not use fiber based media, thus eliminating a number of disadvantages in both fiber based manufacturing processes and fiber media based grating products.

And another advantage of the invention, coincident with the above advantages, is that the invention is economically in comparison to prior art optical gratings.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIG. 4a–p are a series of views at different stages of manufacture of one embodiment of a 1D Bragg grating, wherein:

FIG. 4a is a cross section side view of the Bragg grating as a substrate is prepared;

FIG. 4p is a cross section side view of the Bragg grating after a new transmissive layer is deposited;

FIG. 5a–b are cross section side views depicting laser beams traveling through the finished Bragg grating of FIG. 4a–p, wherein FIG. 5a shows how a beam will travel with minimum loss, and FIG. 5b shows how a beam will encounter constructive interference when the Bragg condition is met;

FIG. 6a–b are cross section side views at different stages of manufacture of a second embodiment of a Bragg grating, wherein FIG. 6a shows the grating after impurities are diffused into a substrate, and FIG. 6b shows the grating after a mask has been applied and additional impurities diffused into the substrate;

In the various figures of the drawings, like references are used to denote like or similar elements or steps.

BEST MODE FOR CARRYING OUT THE INVENTION

Preferred embodiments of the present invention are multidimensional optical gratings, particularly including a two-dimensional (2D) variation which will herein be termed a "planar grating" and a three-dimensional (3D) variation which will herein be termed a "cubical grating."

A basic narrow bandwidth Bragg type grating, that is a one-dimensional (1D) or a "linear grating," is used as the primary example for an initial discussion of manufacturing techniques that may be employed for 1D, 2D, and 3D variations of the gratings. Linear gratings and such manufacturing techniques, generally, are the subject of the present inventors' co pending patent application Ser. No. 09/953, 468, hereby incorporated by reference in its entirety.

Figure 12:
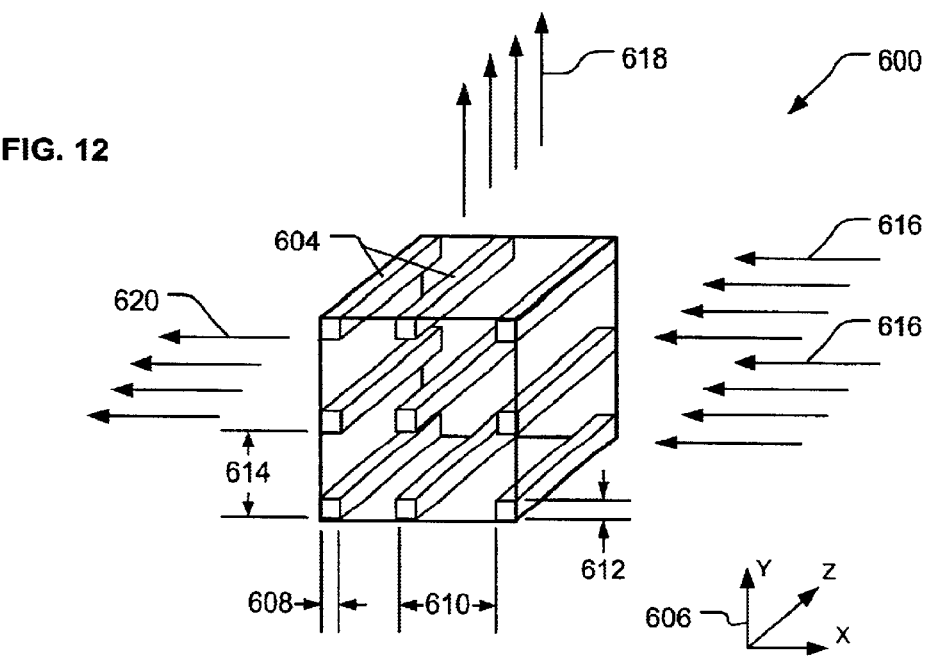
FIG. 12 is a perspective view showing that the principles of the linear grating of FIG. 11 can be extended to a 2D or planar grating.
Figure 13:
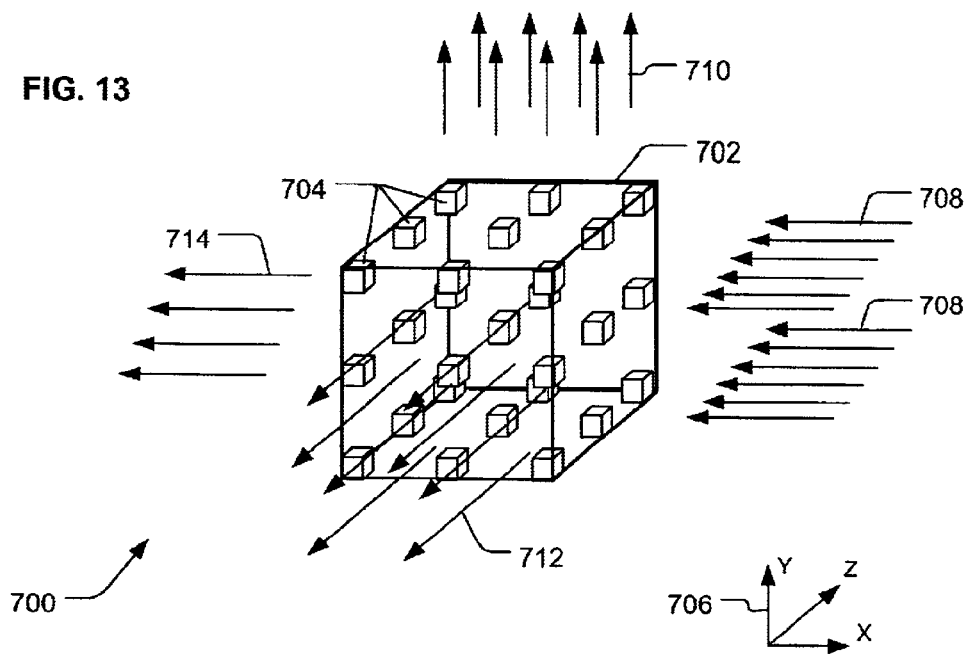
FIG. 13 is a perspective view showing that the principles of the linear grating and the planar grating can be further extended to a 3D or cubical grating.

As illustrated in the various drawings herein, and particularly in the views of FIG. 12 and 13, the 2D preferred embodiment of the invention is depicted by the general reference character 600 and the 3D preferred embodiment of the invention is depicted by the general reference character 700.

Figure 1A:
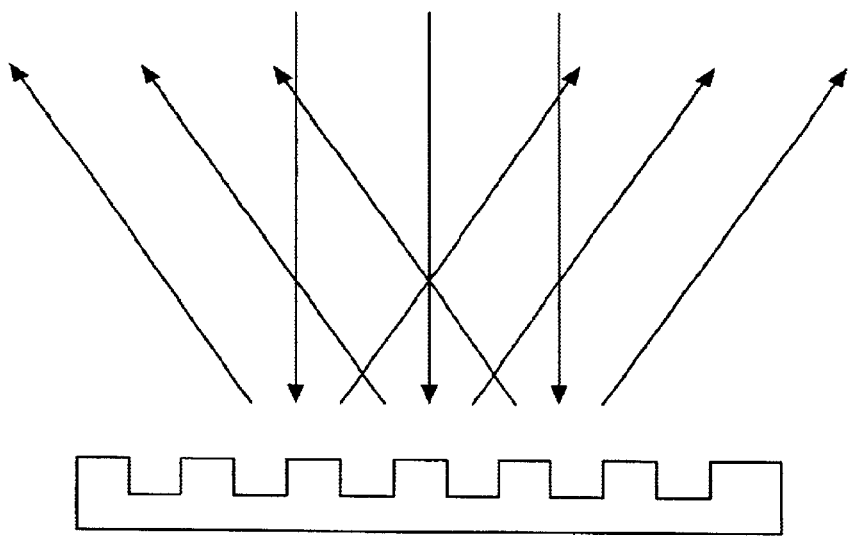
FIG. 1a–b (background art) are cross sectional views of two traditional gratings, with depictions of light beams arriving incident to and being redirected by the gratings.
Figure 1B:
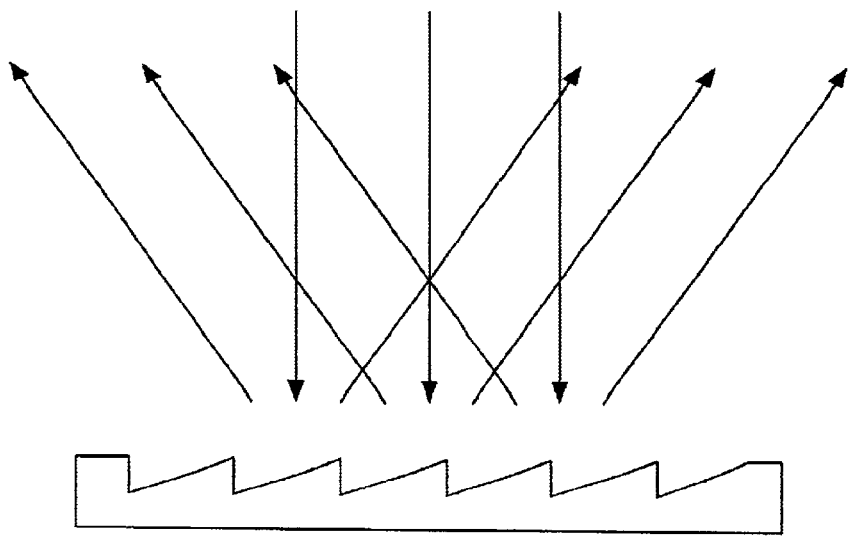
Figure 2:
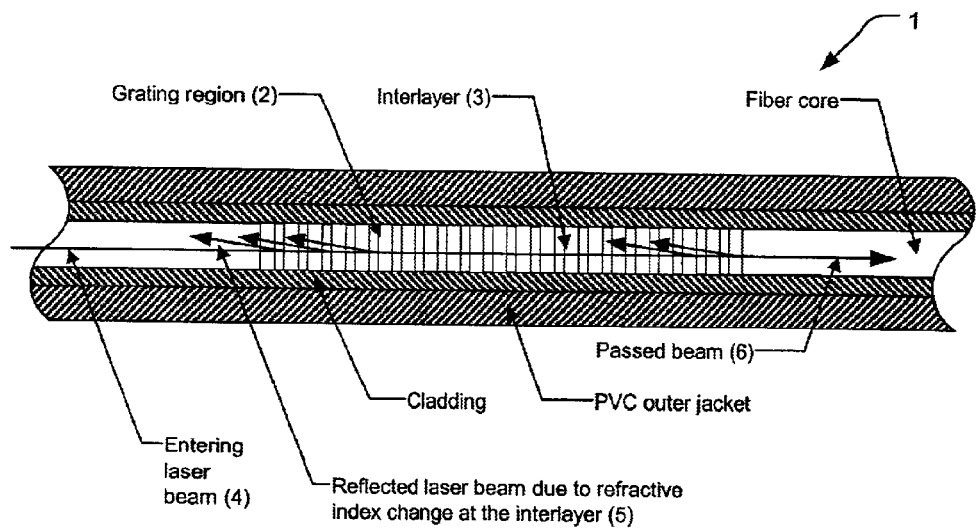
FIG. 2 (background art) is a cross sectional view of a conventional fiber Bragg grating, including a stylized depiction of a laser beam traveling through the grating.
Figure 3:
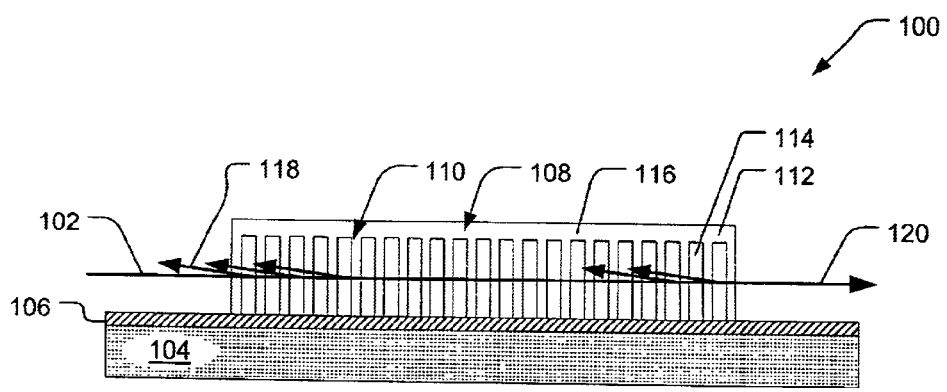
FIG. 3 is a cross sectional view of a one-dimensional (1D) or linear Bragg grating, including a stylized depiction of a laser beam traveling through the grating.

FIG. 3 is a cross sectional view depicting a one-dimensional (1D) or linear Bragg grating 100, with a laser beam 102 stylistically represented as traveling through it. The Bragg grating 100 includes a substrate 104, atop which the major operational elements have been constructed. The substrate 104 may be a material such as silicon wafer, glass plate, etc. A reflective layer 106 has been deposited atop the substrate 104. Suitable materials for this include inherently reflective ones, such as metallic coatings like gold, silver, or aluminum, as well as materials having a low refractive index relative to the refractive indices of the materials in a grating region (described next).

A grating region 108 is provided atop the reflective layer 106. Various materials and manufacturing techniques may be used to construct this grating region 108 and, in fact, a substantial part of the following discussion covers such variations. For purposes of this introduction, the grating region 108 can be viewed simply as including an interlayer 110 of regions of a first transmissive material 112 and a second transmissive material 114. The first transmissive material 112 and second transmissive material 114 have different refractive indices and are interspaced by one-quarter of the wavelength of light which the Bragg grating 100 will filter (or by an odd numbered multiple of one-quarter wavelength).

An over-fill layer 116 is provided atop the grating region 108. It may be a material having a different refractive index, relative to the refractive indices of the other materials in the grating region 108, it may be additional of the transmissive materials 112, 114 (as is shown here), or it may be a metallic coating similar to the reflective layer 106 used for similar purposes below the grating region 108.

Operationally, the Bragg grating 100 receives the laser beam 102 in the manner shown in FIG. 3. [For simplified explanation, "laser beam" is used herein as a generic term to represent all suitable light beams. Although light from laser sources is today predominantly used in applications where the Bragg grating 100 will be widely employed, those skilled in the art will readily appreciate that light from other sources may be used as well.] The reflective layer 106 serves to reflect strayed portions of the laser beam 102 back in the original direction. Similarly, the over-fill layer 116 also does this. Here the over-fill layer 116 is of the same material as the second transmissive material 114 and it reflects the laser beam 102 because its index of refraction is substantially higher than that of the surrounding air.

As the laser beam 102 passes through the interlayer 110 of the grating region 108 it encounters the boundaries between the first and second transmissive materials 112, 114. In particular, it encounters the respectively different refractive indices there. Partial reflection then occurs as the laser beam 102 passes through each boundary, forming a reflected beam 118 and a passed beam 120. [The reflected beam 118 is stylistically shown in FIG. 3 as a plurality of parts with incidence angles purposely skewed to distinguish the reflected beam 118 from the laser beam 102.] The reflected beam 118 will include a narrow range of wavelengths, formed in the characteristic manner of the Bragg condition by constructive interference in the light that is reflected, and the passed beam 120 includes the light of other wavelengths that were also present in the laser beam 102.

Figure 4A:
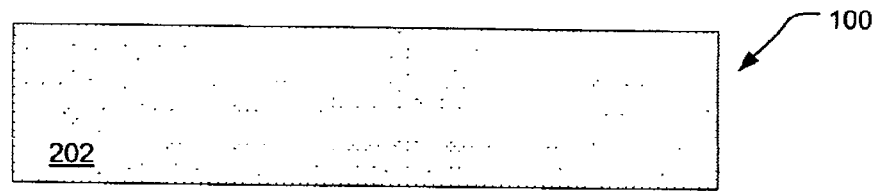
Figure 4B:
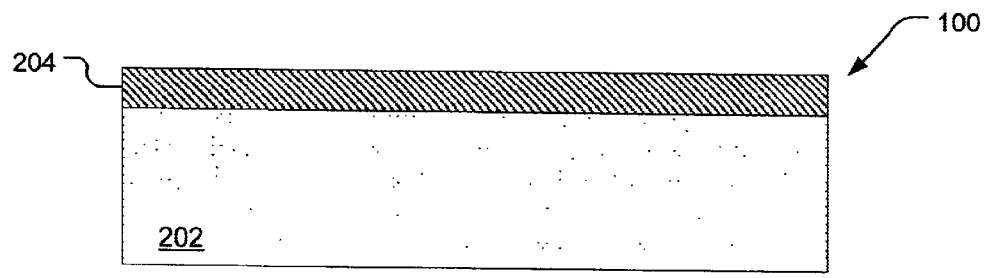
FIG. 4b is a cross section side view of the Bragg grating as a layer of photoresist is deposited.
Figure 4C:
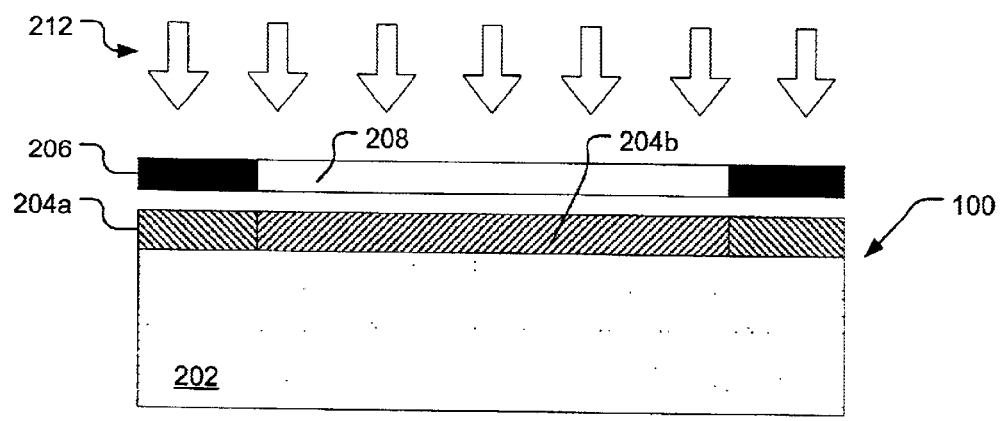
FIG. 4c is a cross section side view of the Bragg grating as it is exposed under a pattern.
Figure 4D:
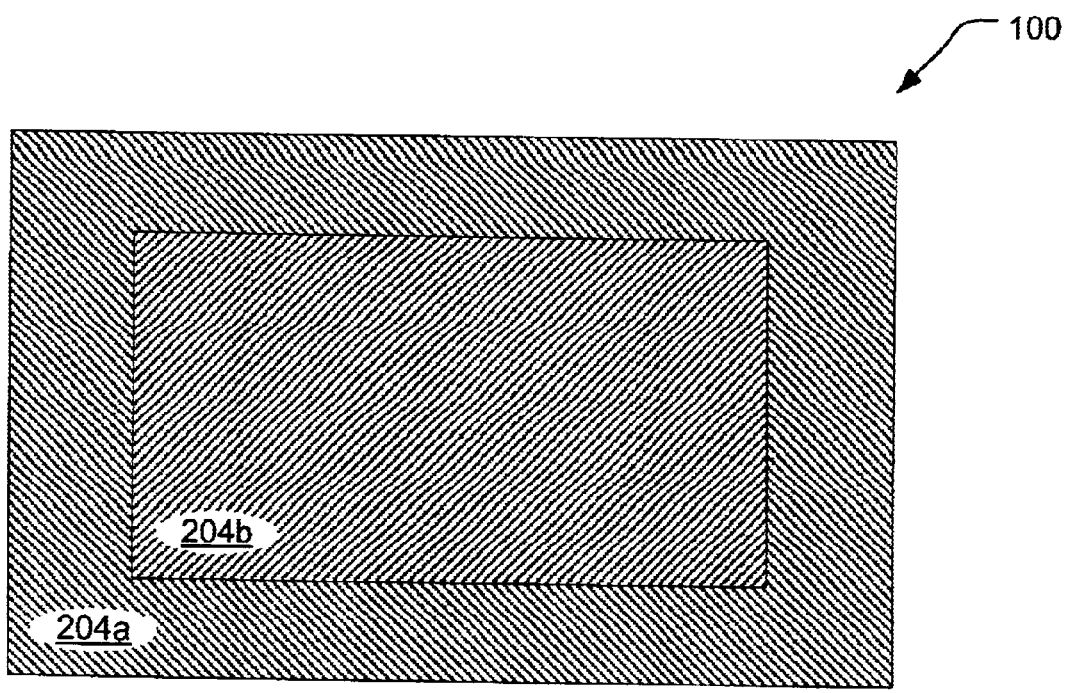
FIG. 4d is a top plan view of the Bragg grating after it is exposed.
Figure 4E:
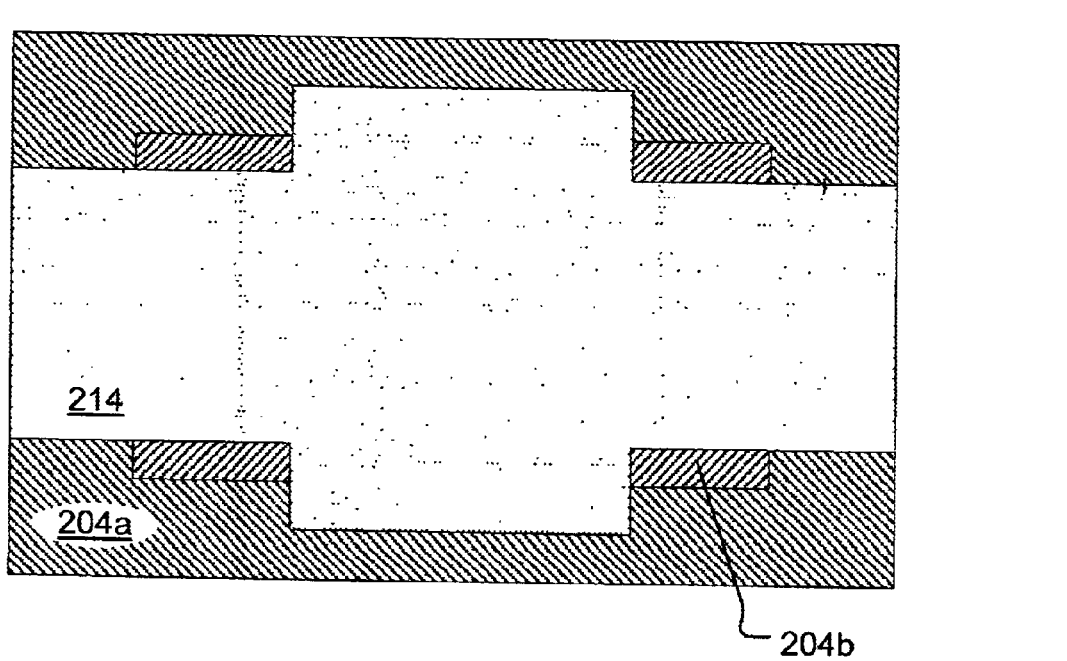
FIG. 4e is a top plan view of the Bragg grating after a transmissive layer is deposited.
Figure 4F:
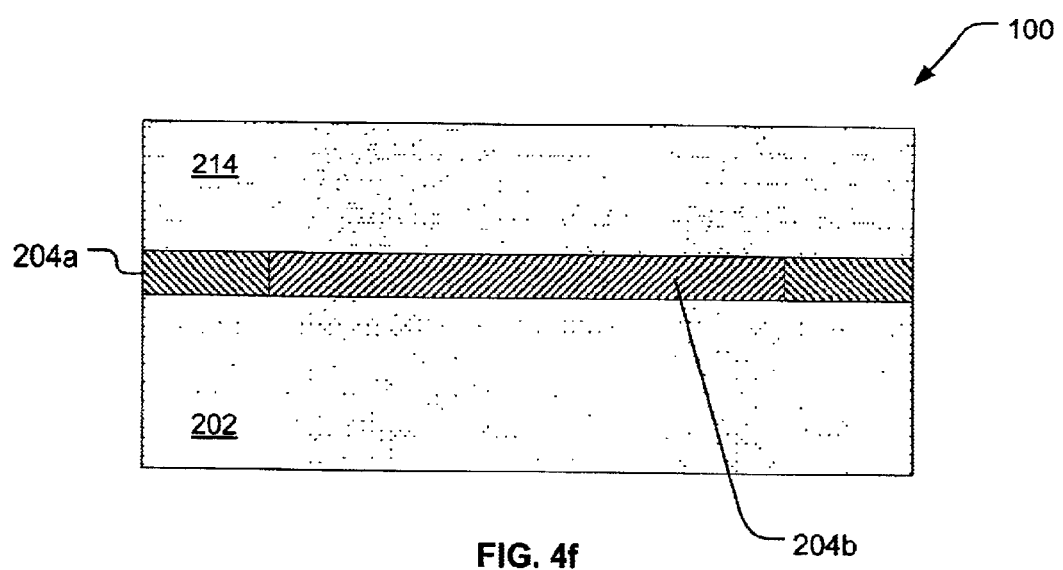
FIG. 4f is a cross section side view of the Bragg grating at the stage in FIG. 4e.
Figure 4G:
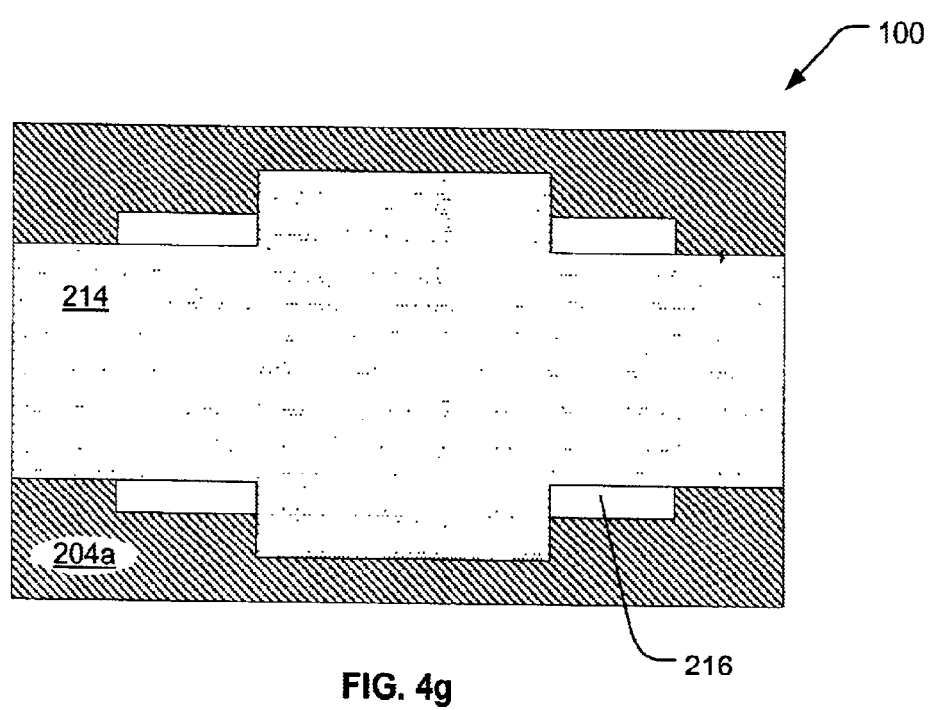
FIG. 4g is a top plan view of the Bragg grating after the exposed photoresist is removed.
Figure 4H:
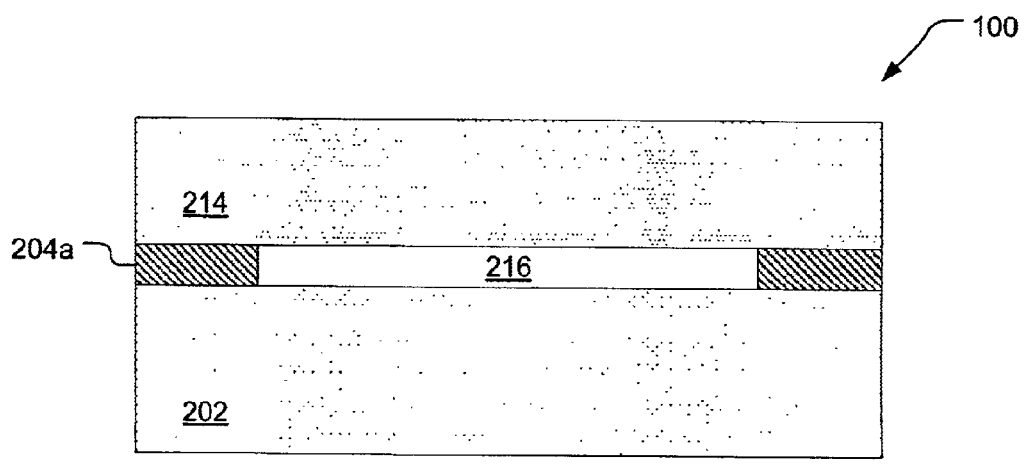
FIG. 4h is a cross section side view of the Bragg grating at the stage in FIG. 4g.
Figure 4I:
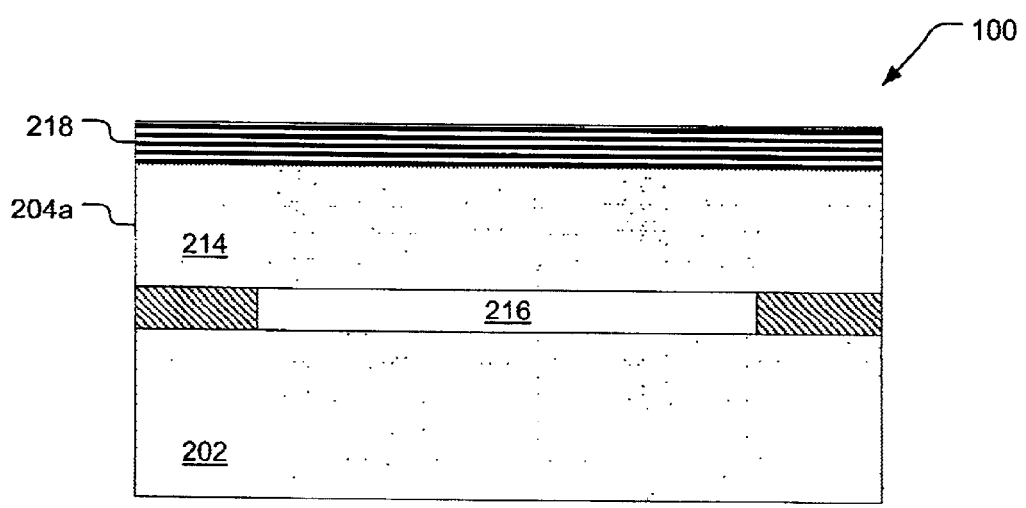
FIG. 4i is a cross section side view of the Bragg grating after a new layer of photoresist is deposited.
Figure 4J:
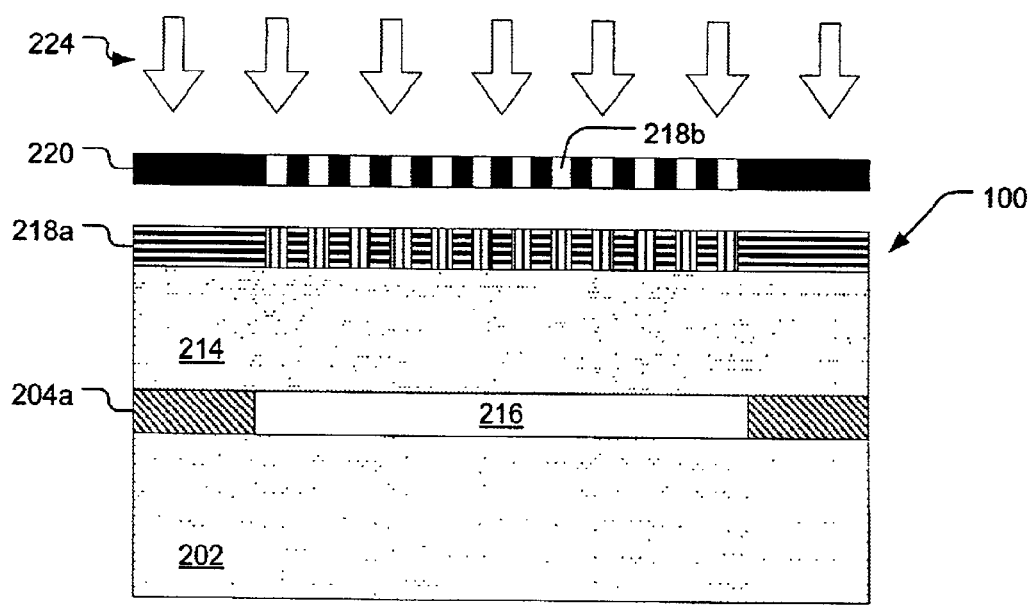
FIG. 4j is a cross section side view of the Bragg grating as it is exposed under a pattern.
Figure 4K:
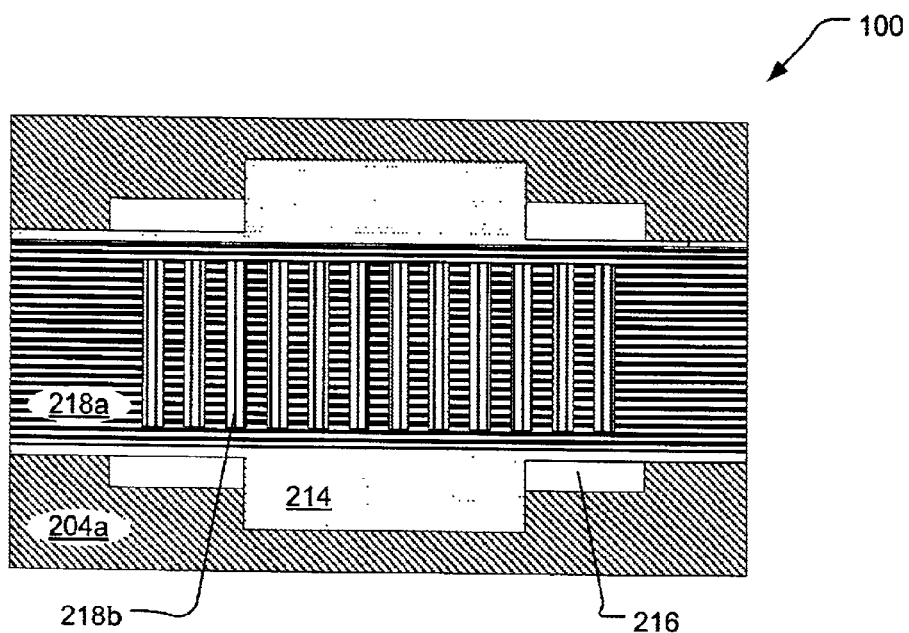
FIG. 4k is a top plan view of the Bragg grating after it is exposed.
Figure 4L:
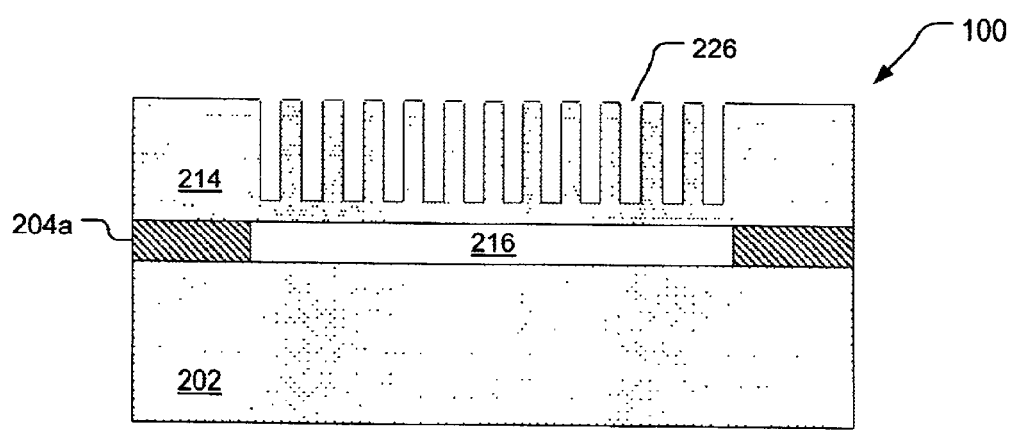
FIG. 4l is a cross section side view of the Bragg grating after the exposed photoresist and portions of the layer below are removed.
Figure 4M:
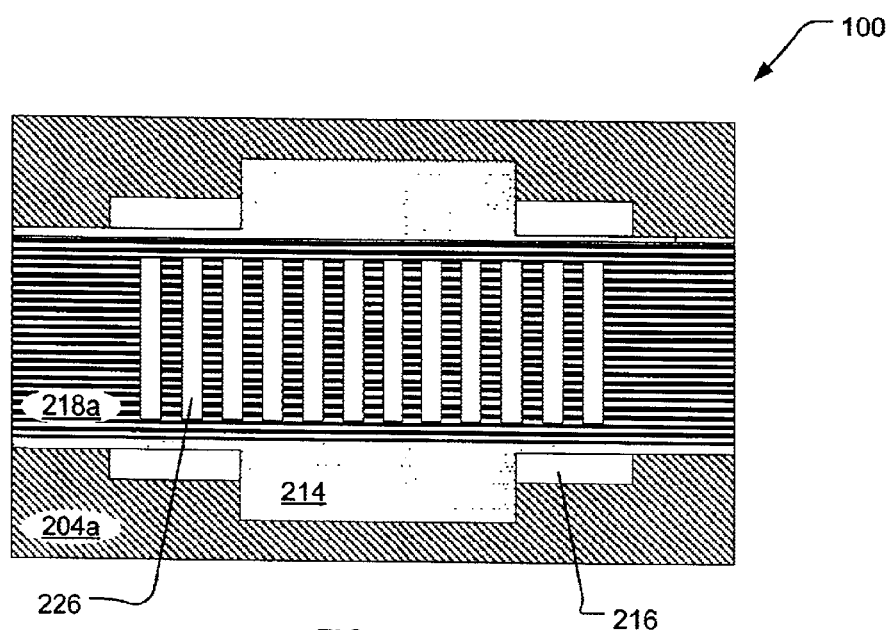
FIG. 4m is a top plan view of the Bragg grating at the stage in FIG. 4l.
Figure 4N:
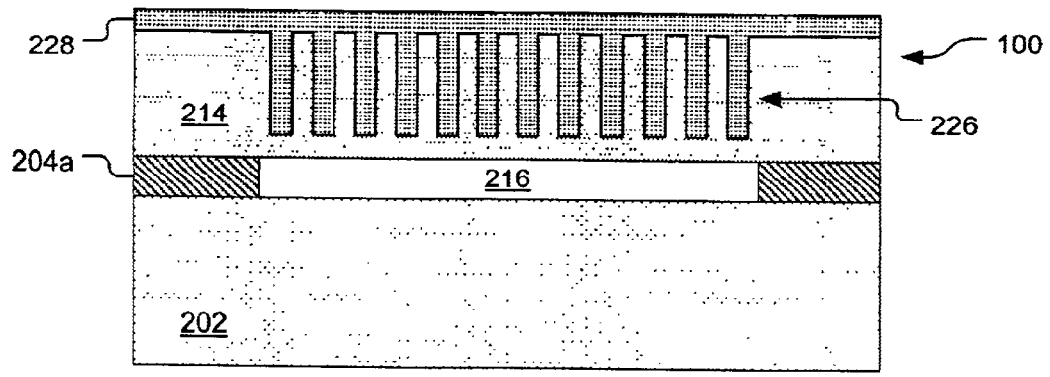
FIG. 4n is a cross section side view of the Bragg grating after a material having a different refractive index than the transmissive layer is deposited.
Figure 4O:
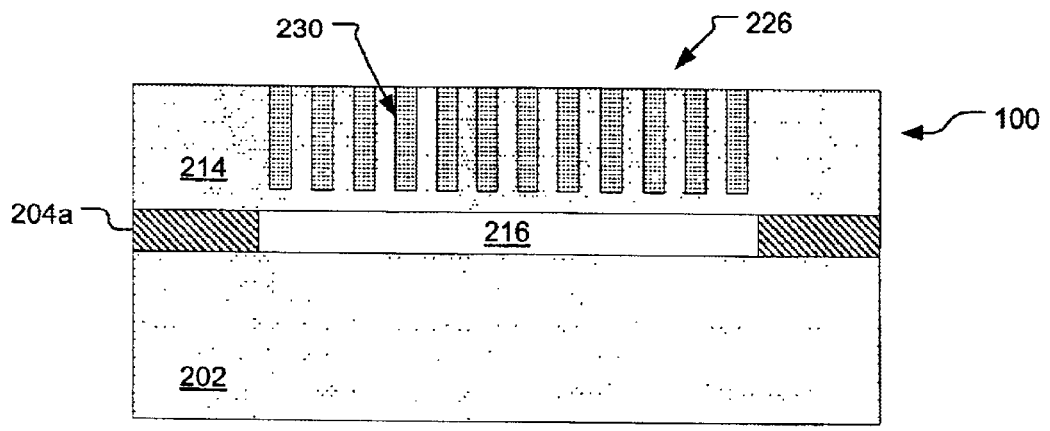
FIG. 4o is a cross section side view of the Bragg grating after excess material is removed.
Figure 4P:
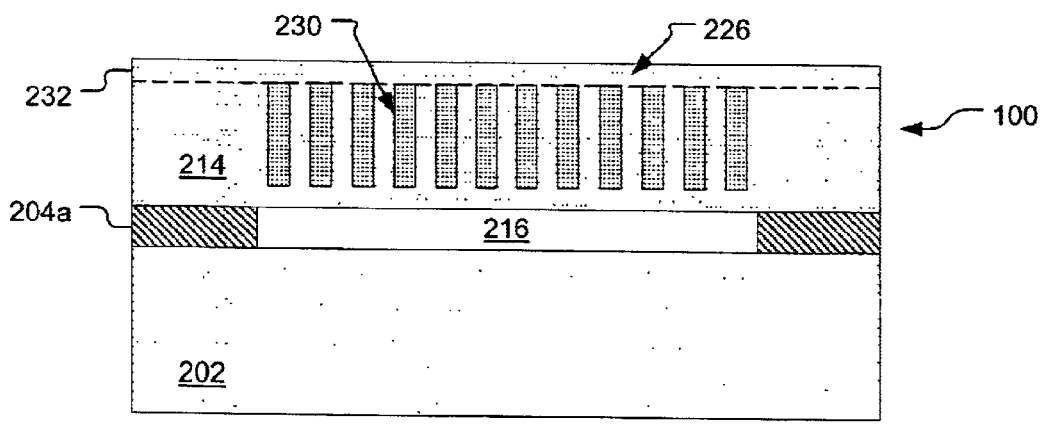

FIG. 4a–p are a series of views at different stages of manufacture of one of a presently preferred embodiments of the Bragg grating 100. FIG. 4a is a side view of a substrate 202. As already noted, the substrate is of a suitable material upon which the major operational elements are constructed.

At this initial stage the substrate 202 is essentially homogeneous. FIG. 4b is a side view after a photoresist layer 204 has been deposited atop the substrate 202.

FIG. 4c is a side view as the Bragg grating 100 is exposed. A photomask 206 having a pre-designated pattern 208 is provided and the Bragg grating 100 is exposed through it to light 212 which is appropriate for causing a photochemical reaction in the photoresist layer 204. This produces an unexposed region 204a and an exposed region 204b. FIG. 4d is a top view of the Bragg grating 100 after exposure, particularly depicting the unexposed region 204a and the exposed region 204b. Typically these would be termed to now have negative resist and positive resist, respectively.

FIG. 4e is a top view of the Bragg grating 100 after a transmissive layer 214 is deposited. As can be seen, some of the unexposed region 204a and some of the exposed region 204b of the photoresist layer 204 are left uncovered at this stage. FIG. 4f is a side view at this stage. The transmissive layer 214 has a thickness exceeding the height of light beams with which the Bragg grating 100 will later be used. In the inventor's presently preferred embodiment SiO2 is used for the transmissive layer 214. This material is easily "worked" as needed and its refractive index, of nominally 1.52, is also good Many other materials may also be used, however. Without limitation, other suitable candidates which are widely used industrially are Al2O3, with a refractive index of 1.63, and MgF2, with a refractive index of 1.38. [Still other candidates include amorphous silicon-hydrate (SiH, SiH2, SiH3, SiH4), B, P, ZnSe, ZnS, GaP, SrTiO3, Si, Ge, InSb, YSZ, AlAs, BaTiO3, BiSiO2O, Bi12GeO2O, AlN, BN, AgGaS2, LiTaO3, CuCaS2, TlI, TlCl, TlBr, AgCl, AgBr, AgI, AgGaSe2, KnbO3, and even some organic materials.]

The unexposed region 204a remains once the exposed region 204b is removed (via any of various conventional means, chemical etching, dry etch techniques, subliming by baking, etc.). FIG. 4g is a top plan view and FIG. 4h is a side view of the Bragg grating 100 after removal. As can particularly be seen in FIG. 4h, removing the exposed region 204b leaves an air gap 216 between the substrate 202 and the transmissive layer 214. [Note, the "air gap" here may ultimately contain any gas present in the environment surrounding the Bragg grating 100. The inert gasses, N2, CO2, air, other gas mixtures, etc. are examples of gases commonly used in electronic equipment today. For that matter, the "air gap" can even be a vacuum. As will be seen in the operational discussion, below, the index of refraction of the air gap is what is key, and not what fills it.]

FIG. 4i is a side view of the Bragg grating 100 after a new photoresist layer 218 has been deposited, and FIG. 4j is a side view as it is exposed. A photomask 220 having a grating pattern 222 is here provided and the Bragg grating 100 is exposed through it to light 224. This produces an unexposed region 218a and a plurality of exposed regions 218b. FIG. 4k is a top view of the Bragg grating 100 after it is exposed in this manner, particularly showing the unexposed region 218a and the exposed regions 218b.

FIG. 4l is a side view of the Bragg grating 100 after the exposed regions 218b of the photoresist layer 218 and portions of the transmissive layer 214 below it have been removed. In FIG. 4l the unexposed region 218a is also shown as having already been removed. A key point to note, for this manufacturing variation, is that portions of the transmissive layer 214 are not removed so deeply that the air gap 216 is reached. The reason for this is provided in an operational discussion, below. FIG. 4m is a top view of the Bragg grating 100 at this stage. From FIG. 4l and FIG. 4m it can be appreciated that an array of open trenches now defines the grating region 226 in the transmissive layer 214.

FIG. 4n is a side view of the Bragg grating 100 after an over-fill layer 228 is deposited into the array of trenches. The over-fill layer 228 is of a material having a slightly different refractive index than the transmissive layer 214, and it fills in the openings grating region 226 so that a linearly extending interlayer array 230 is formed. The material of the over-fill layer 228 may be one of the same set of candidate materials for the transmissive layer 214, e.g., Si, SiO2, Al2O3, MgF2, etc., but it will either be of a different such material or, if the same, it will be treated to achieve a different refractive index.

FIG. 4o is a side view of the Bragg grating after excess material from the over-fill layer 228 has been removed. One process suitable for this is polishing. The unexposed region 218a was shown as having been already removed in FIG. 4l but it could alternately have been left, the over-fill layer 228 applied atop it, and then it and the excess from the over-fill layer 228 removed together. In some manufacturing scenarios this is a matter of mere choice, but in others there may be an incentive to remove the over-fill layer 228 earlier. For instance, in common semiconductor fabrication processes organic photoresist materials are used. These are generally suitable for use here as well, but with early removal desirable to avoid contaminating the over-fill layer 228 as it is later applied.

Finally, FIG. 4p is a side view of the Bragg grating 100 after a new transmissive layer 232 is deposited. In this embodiment the inventors prefer that the transmissive layer 214 and the transmissive layer 232 have the same refractive index, and thus that they be of the same material. This is not a requirement, however. The transmissive layer 232 may, for instance, be of the same material and have the same refractive index as the over-fill layer 228. As will become more clear in the discussion below, it is desirable that the over-fill layer 228 have a refractive index substantially different than that of air (refractive index=1). Thus a material like, say, MgF2 with a refractive index of 1.38, may be quite suitable for use in the over-fill layer 228 but not in the transmissive layer 232. This completes construction of the Bragg grating 100.

Figure 5A:
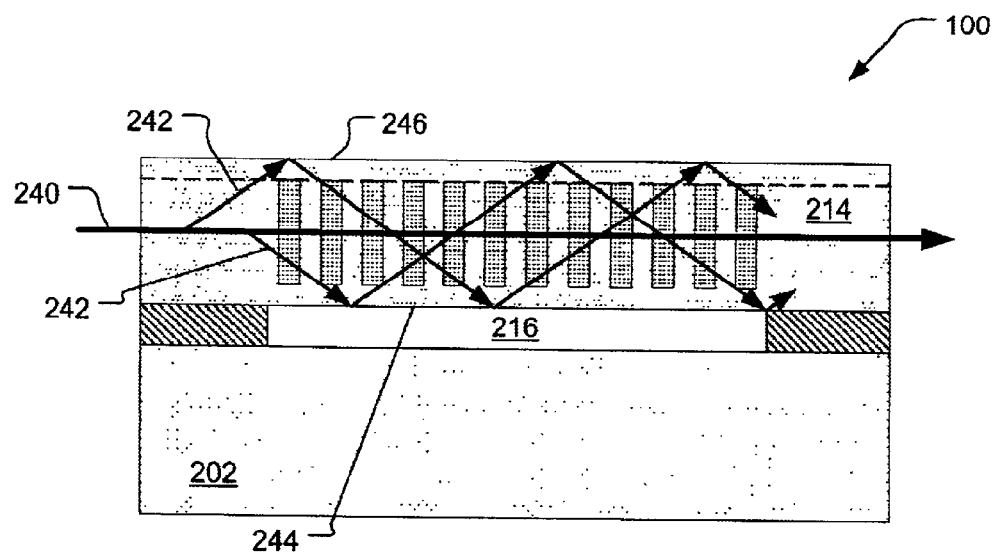
Figure 5B:
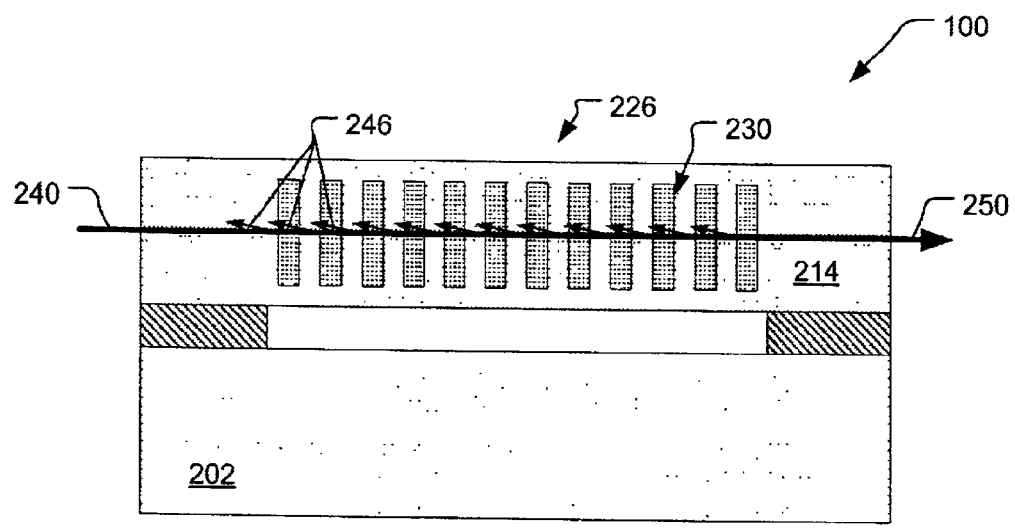

FIG. 5a–b are cross section side views depicting a light beam 240 traveling through the finished Bragg grating 100 of FIG. 4a–p. In FIG. 5a the light beam 240 has strayed portions 242, some of which go upward and others of which go downward. The downward traveling of the strayed portions 242 encounter an interface 244 at the juncture of the transmissive layer 214 and the air gap 216, and are reflected back into the transmissive layer 214. Similarly, the upward traveling of the strayed portions 242 encounter an interface 246 at the juncture of the transmissive layer 232 and the air above the Bragg grating 100, and are reflected back into the transmissive layer 232. Thus the interface 244 created at the air gap 216, and the disparity between the refractive indices, is used to achieve reflection This is structurally different than the embodiment of FIG. 3, where the reflective layer 106 was deposited below the grating region 108, but it is functionally equivalent The light beam 240 is thus here also able to travel through the Bragg grating 100 with minimum power loss.

FIG. 5b shows how the main portion of the light beam 240 encounters the interlayer array 230 in the grating region 226, how a reflected portion 248 (stylistically shown here also as a plurality of parts with purposely skewed incidence angles)

is created, and how a passed portion ions 250 is passed. The reflected portion 248 will include a narrow range of wavelengths, formed by constructive interference, and the passed portion 250 will include the light of other wavelengths that are also present in the light beam 240.

Figure 6A:
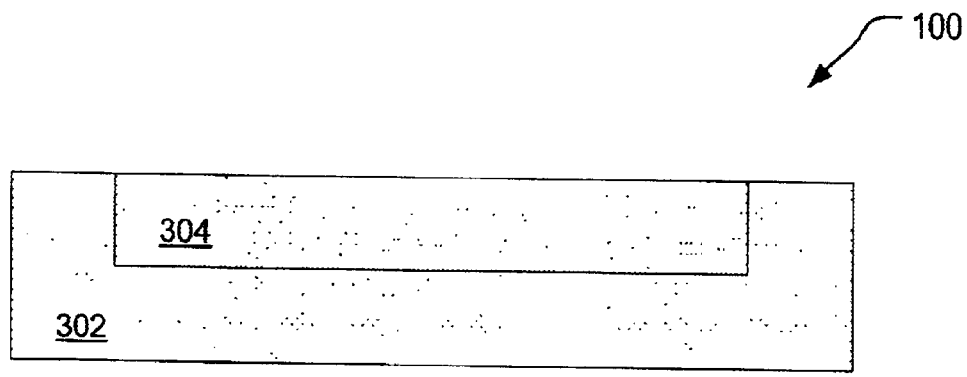
Figure 6B:
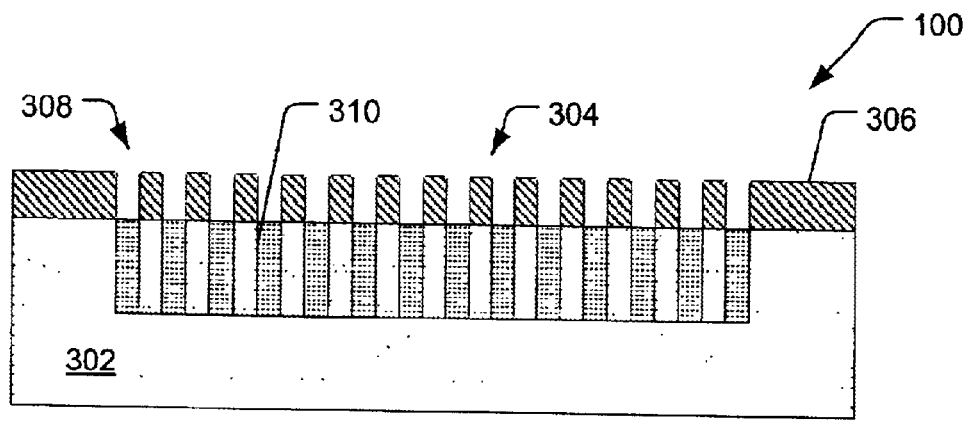

FIG. 6a–b are side views at different stages of manufacture of a second embodiment of a Bragg grating 100. FIG. 6a shows the Bragg grating 100 in an early stage of manufacture, after a substrate 302 has had impurities diffused into a grating region 304. FIG. 6b shows the Bragg grating 100 in a later stage of manufacture, after a mask 306 having a suitable open grating pattern 308 has been applied and additional impurities have been diffused into the grating region 304 below the openings in the grating pattern 308 to form a linearly extending interlayer array 310. The Bragg grating 100 here can then be finished, in straightforward manner, by removing the mask 306 and applying an over-fill layer (not shown).

This approach employs the fact that the refractive indices for certain materials will change when impurities are diffused into them. One well known example is silicon: the refractive index for pure silicon is 3.5 but reduces to as low as 2.1 when a heavy dosage of hydrogen is diffused into it. The refractive index can further be reduced to even lower than 1.5 by incorporating different levels of oxygen. Another example material is silica (SiO2): when it's diffused with germanium and under exposure of UV light its refractive index increases slightly. The Bragg grating 100 depicted in FIG. 6a–b can thus take advantage of these properties to obtain the desired characteristics in the interlayer array 310.

Figure 7:
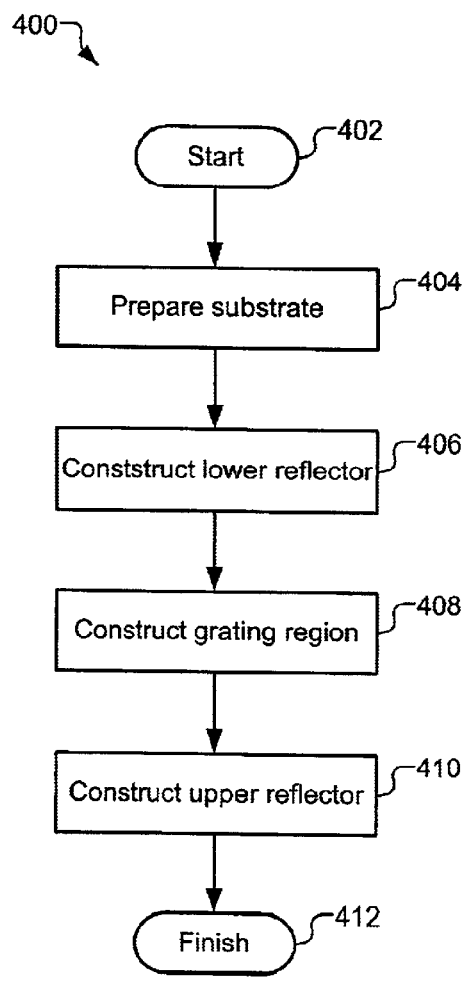
FIG. 7 is a flow chart summarizing a process for creating the Bragg grating.

FIG. 7 is a flow chart summarizing a process 400 for creating the Bragg grating 100. The process 400 starts in a step 402, where basic and conventional set up operations can be performed, as needed and as desired.

In a step 404 a substrate is provided and prepared. This serves as the basis of a workpiece for the rest of the process 400 and for construction of the Bragg grating 100.

In a step 406 a lower reflective means is constructed

In a step 408 a grating region having an interlayer is constructed. In a step 410 an upper reflective means is constructed.

Finally, in a step 412 the process 400 ends. This is where basic and conventional wrap up operations can be performed, as needed and as desired. The process 400, which in deed has been described very generally, is now finished.

Figure 8:
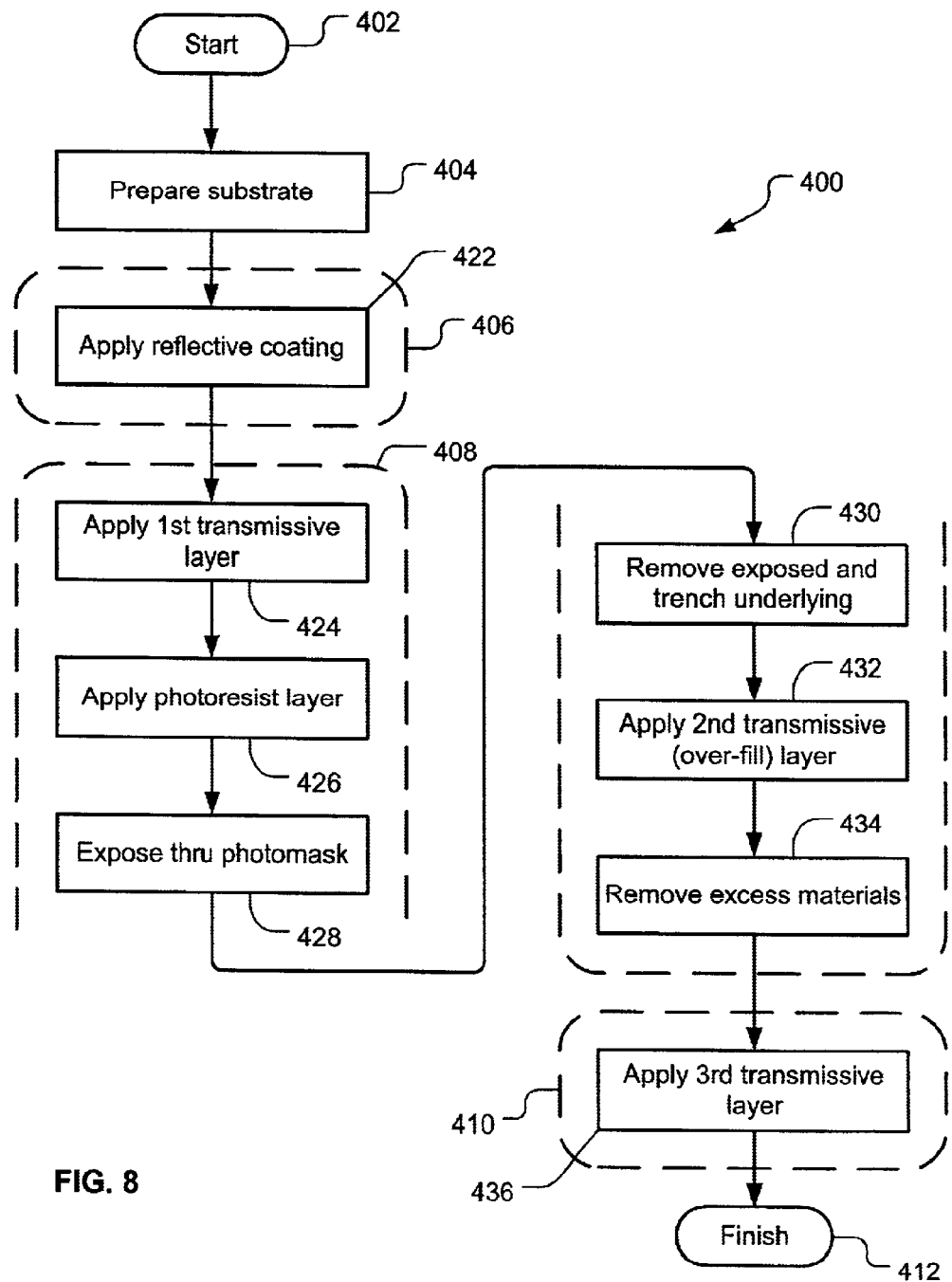
FIG. 8 is a flow chart showing application of the process to create the embodiment of the Bragg grating of FIG. 3.

FIG. 8 is a flow chart showing application of the process 400 to create the Bragg grating 100 of FIG. 3. The conventional or straightforward step 402 (start) and step 404 (substrate preparation) again occur. The step 406 (constructing a lower reflective means) here includes a single sub-step 422 for providing a reflective layer, such as a metallic coating, onto the (substrate) workpiece.

The step 408 (constructing the grating region and interlayer) here includes a number of sub-steps. The first of these is a sub-step 424 to provide a first transitive layer on the workpiece, atop the reflective layer. In a sub-step 426 a first photoresist layer is then provided on the workpiece, atop the firs transmissive layer. In a sub-step 428 the workpiece is exposed under a photomask. The photomask particularly has a pattern as already described, e.g., for a simple Bragg grating a pattern interspaced by one-quarter of the wavelength (or by an odd numbered multiple of that) of the light which will be filtered.

In a sub-step 430 the exposed portions of the first photoresist layer are removed. Underlying portions of the first transmissive layer are also removed to a desired depth.

In a sub-step 432 a second transmissive layer is applied to the workpiece, atop the unetched portions of the first photoresist layer and filling in the first transmissive layer. The second transmissive layer particularly has a different index of refraction than the first transmissive layer.

In a sub-step 434 excess material, that is the upper most material here, is removed from the workpiece. Specifically, the second transmissive layer and unetched portions of the first photoresist layer are removed to a depth at least flush with the top most portions of the first transmissive layer. This completes the step 408 (grating region and interlayer construction).

The step 410 (constructing the upper reflective means) here includes a single sub-step 436 for providing a third transmissive layer on the workpiece, atop the remaining first and second transmissive layer portions. This third transmissive layer has the same index of refraction as the first or second transmissive layer. In a final step 412 the process 400 is now finished.

Figure 9:
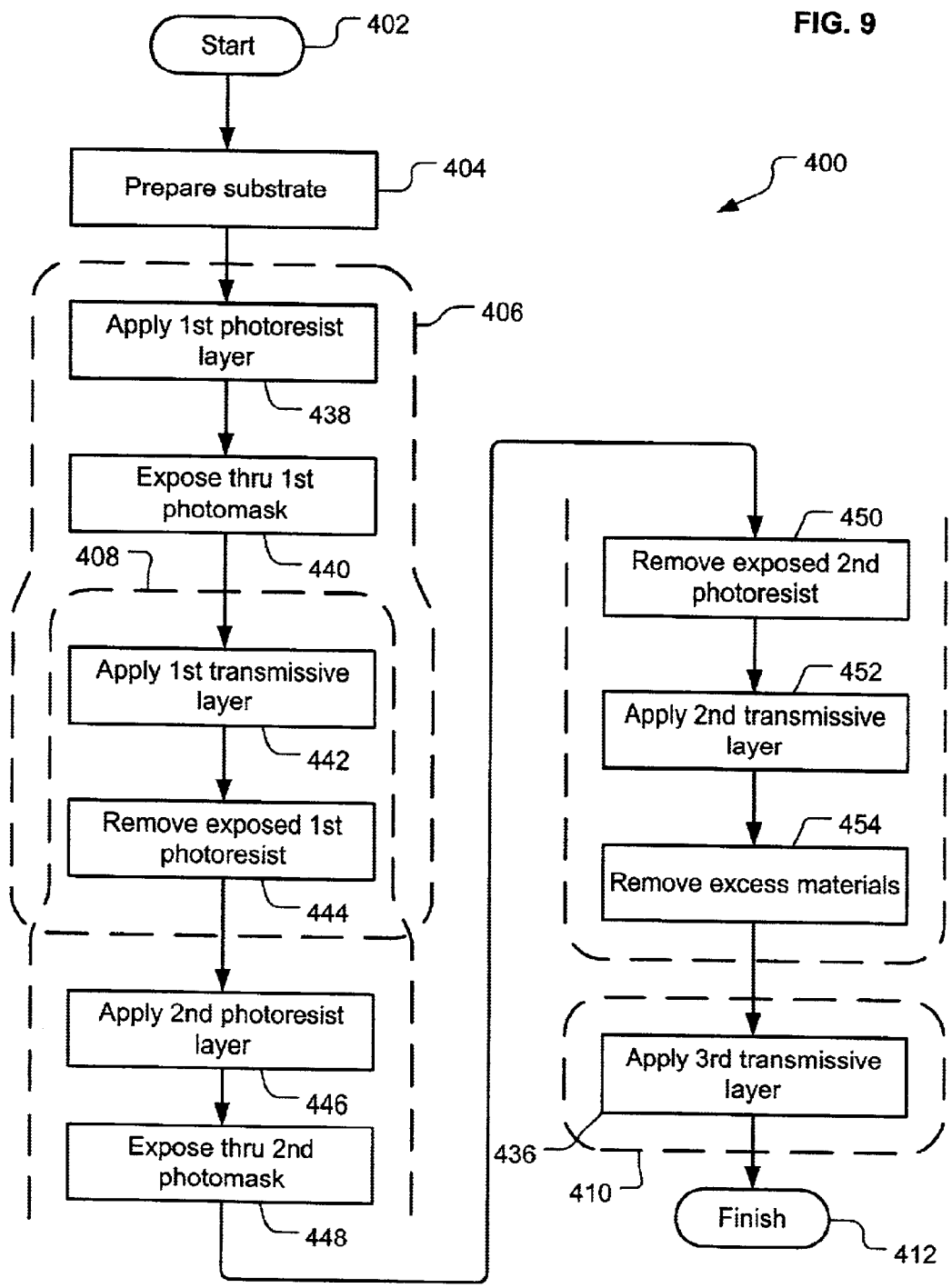
FIG. 9 is a flow chart showing application of the process to create the embodiment of the Bragg grating of FIG. 5a–b.

FIG. 9 is a flow chart showing application of the process 400 to create the Bragg grating 100 of FIG. 5a–b. The conventional or straightforward step 402 (start) and step 404 (substrate preparation) again occur.

The step 406 (constructing a lower reflective means) here includes a number of sub-steps. The first of these is a sub-step 438 to provide a first photoresist layer on the (substrate) workpiece. In a sub-step 440 the workpiece is exposed under a first photomask. In a sub-step 442 a first transmissive layer is provided on the workpiece, atop the first photoresist layer. In a sub-step 444 the exposed portion of the first photoresist layer is removed, leaving an air gap between the substrate and the first transmissive layer.

The step 408 (constructing the grating region and interlayer) here also includes a number of sub-steps. In fact, in this variation on the process 400 the sub-steps 442, 444 are part of both step 406 and step 408. The rest of the step 408 continues with a sub-step 446 where a second photoresist layer is applied to the workpiece, atop the first transmissive layer. In a sub-step 448 the workpiece is exposed under a second photomask having a suitable pattern.

In a sub-step 450 the exposed portions of the second photoresist layer and the underlying first transmissive layer are removed to a desired depth. This leaves an array of openings or trenches.

In a sub-step 452 a second transmissive layer is applied to the workpiece, atop the unetched portions of the second photoresist layer and filling in the trench array in the first transmissive layer. This second transmissive layer has a different index of refraction than the first transmissive layer.

In a sub-step 454 the upper most material, specifically the second transmissive layer and unetched portions of the second photoresist layer, is removed to a depth at least flush with the top most portions of the first transmissive layer. This completes the step 408 (grating region and interlayer construction).

The step 410 (constructing the upper reflective means) here includes the single sub-step 436 for providing a third transmissive layer on the workpiece, atop the remaining first and second transmissive layer portions. This can be essentially the same as the step 410 and sub-step 436 of FIG. 8. In a final step 412 the process 400 is now finished.

Figure 10:
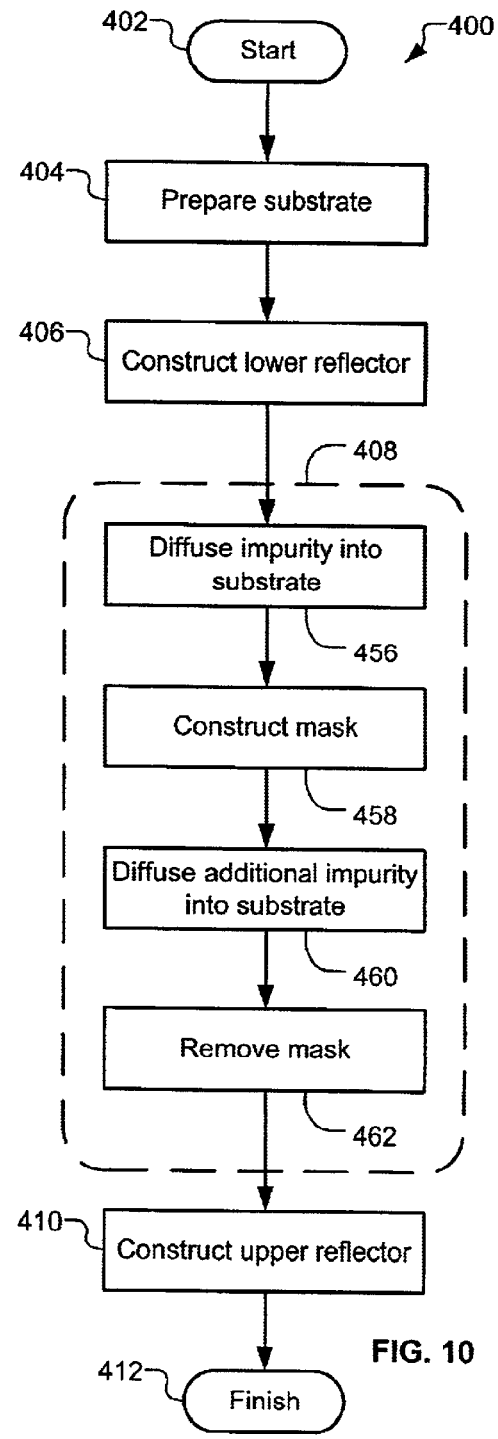
FIG. 10 is a flow chart showing application of the process to create the embodiment of the Bragg grating of FIG. 6a–b.

FIG. 10 is a flow chart showing application of the process 400 to create the Bragg grating 100 of FIG. 6a–b. The conventional or straightforward step 402 (start) and step 404 (substrate preparation) again occur.

The step 406 (constructing a lower reflective means) here may be viewed as a variation of the approach used for step 410 in FIG. 8 and FIG. 9, or as a variation of the approach used for step 406 FIG. 9. A lower reflector is formed by the interface of the material of the substrate with air or another material below the substrate. As discussed, below, the grating region need not extend all the way down and through the substrate, and the excess material in the substrate thus can serve as part of the lower reflector. In this regard, step 404 and step 406 are essentially merged. Alternately, a reflective material can be applied, similar to the reflective coating used in sub-step 422 in FIG. 8.

The step 408 (constructing the grating region and interlayer) here includes a number of sub-steps. The first of these is a sub-step 456 to dope a portion of the substrate (or a first transmissive layer atop a substrate) which will ultimately become the grating region with an impurity. In a sub-step 458 a mask is constructed on the workpiece, atop the grating region. In a sub-step 460 an additional or other impurity is doped into the non-masked portions of the grating region. In a sub-step 462 the mask is removed.

The step 410 (constructing the upper reflective means) here may include the approach shown in FIG. 8 for step 406, using sub-step 422, or it may include the approach shown in FIG. 8 and FIG. 9 for step 408, using sub-step 436. Finally, in a step 412 the process 400 is finished. It is, however, a straightforward extension of the process 400 to use multiple iterations of the various steps, to construct the sophisticated variations on the Bragg grating 100 which are now described.

With reference back to the earlier figures, more than two transmissive materials can be placed into the path a light beam will encounter. In FIG. 5b two materials having two indices of refraction are present in the transmissive layer 214 and in the interlayer array 230. In FIG. 6b, the substrate 302 is one material having one index of refraction, and the interlayer array 310 is effectively of two other materials (after it is doped or has impurity diffused into it). Even variations on the Bragg grating 100 like those in FIG. 3, FIG. 5a–b, and FIG. 6a–b are relatively simple, and the true scope of the invention is much broader. It is a straightforward extension of the process 400 to use multiple materials (actual different materials or effectively so by treatment to change the indices of refraction). One reason to do this is to handle multiple frequencies in a light beam, or to broaden the bandwidth of the frequencies filtered. Similarly, the spacing of the regions in the interlayers 110, 230, 310 can be changed to do this, much in the manner of periodically "chirped" prior art Bragg gratings.

One sophisticated manufacturing technique which may be used is to tune the indices of refraction. For instance, amorphous silicon-hydrate (SiH, SiH2, SiH3, SiH4) can be "tuned" by temperature. This can be used to obtain specific desired indices of refraction, or to apply a gradient in the indices in one or more materials. In this manner, the index of refraction is another factor which can be controlled during grating fabrication to achieve chirped or other sophisticated grating types.

Figure 11:
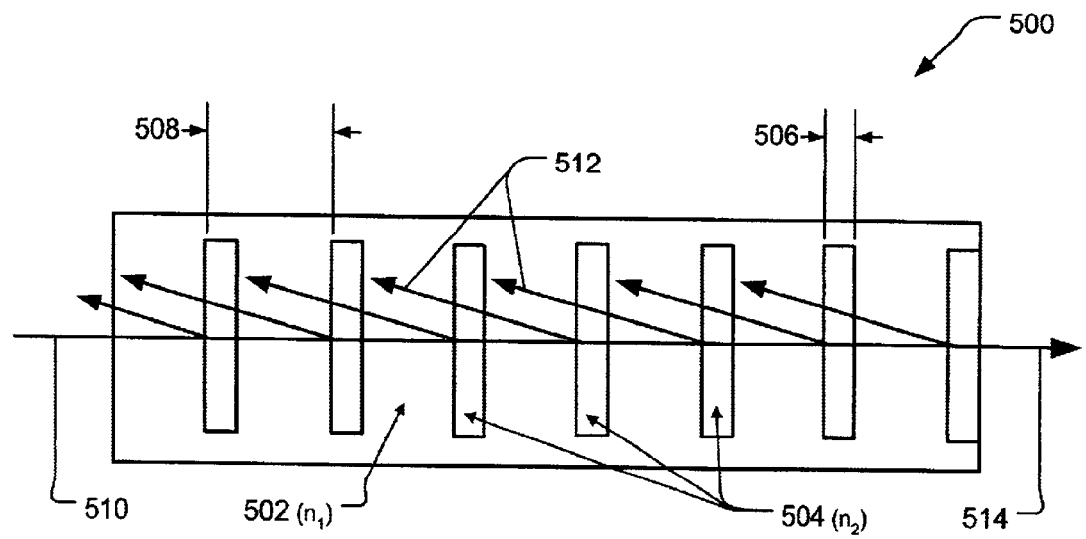
FIG. 11 is a schematic representation summarizing the structure and operation of a one-dimensional (1D) or linear grating, such as the Bragg gratings of FIG. 3–6b.
Figure 20:
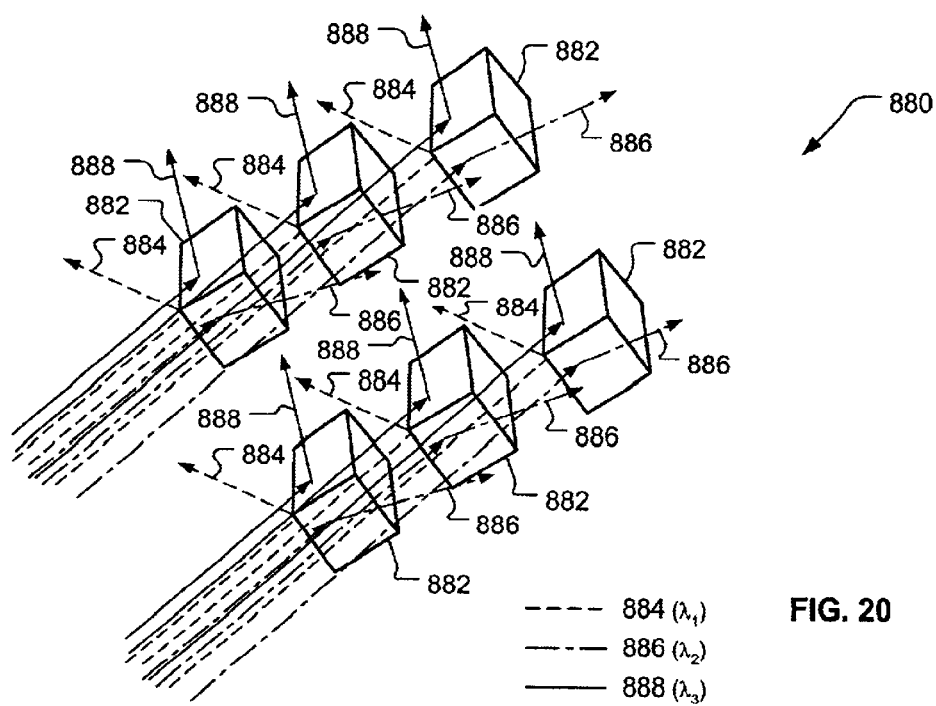
FIG. 20 is a perspective view of a three-dimensional (3D) generic grating.
Figure 18:
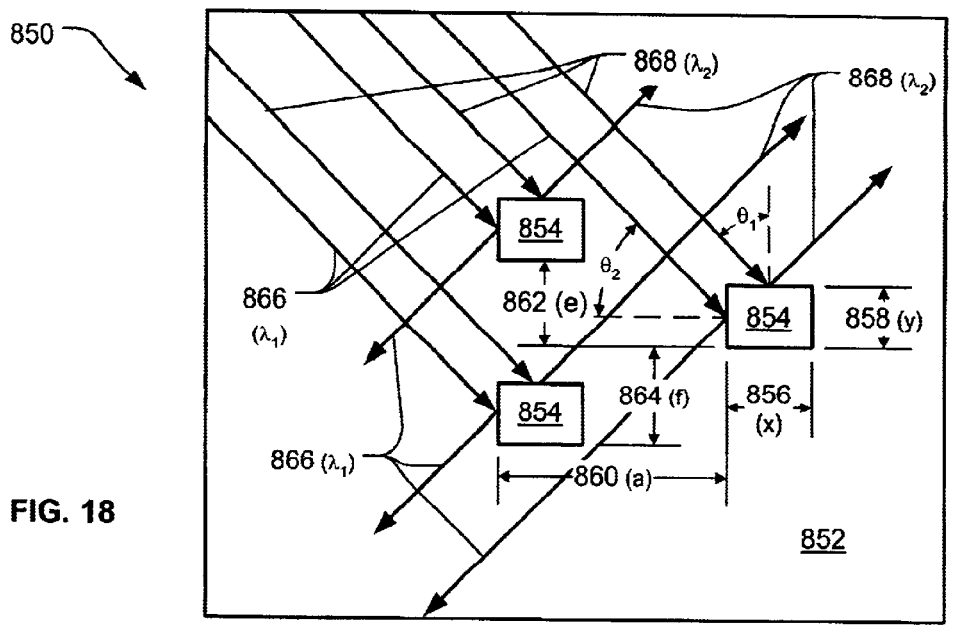
FIG. 18 is a schematic representation of the general case of FIG. 17 extended to operate in two dimensions, on two wavelengths, by using non symmetrical relationships in a generic grating.
Figure 19:
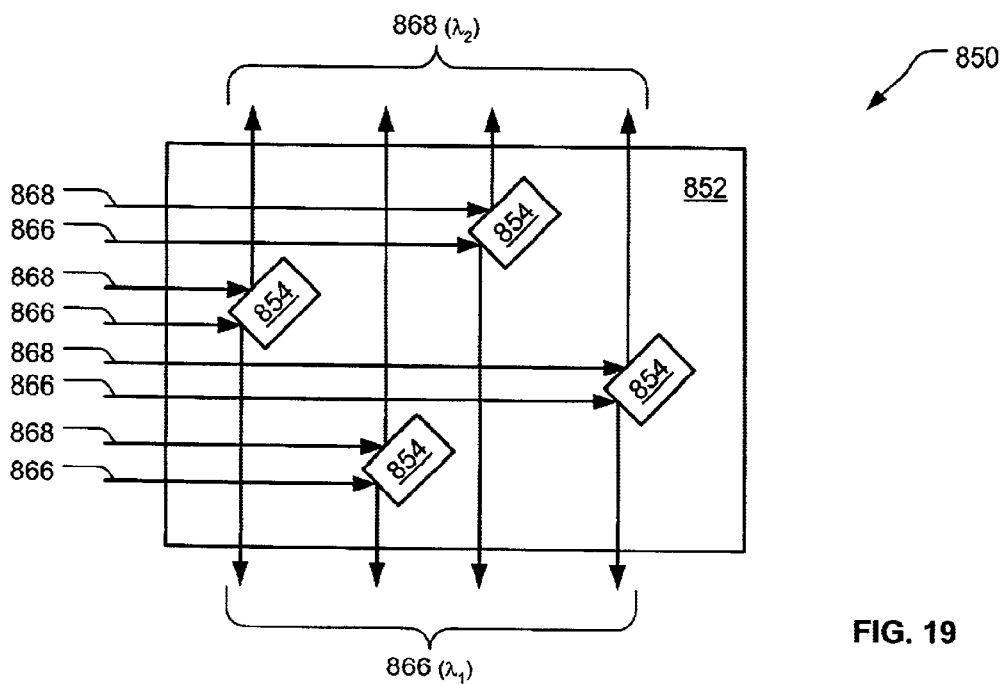
FIG. 19 is a schematic representation of the non symmetrical generic grating of FIG. 18 as it might typically be applied in an actual planar or cubical grating according to the present invention.

FIG. 11 is used next to summarize the one-dimensional (1D) or linear grating. FIG. 12 and 13 then help in an introduction illustrating that the principles of the one-dimensional (1D) or linear grating can be extended to provide a two-dimensional (2D), planar grating, and also a three-dimensional (3D), cubical grating. FIG. 14–17 support derivations extending the principles to the multidimensional, 2D and 3D cases. And FIG. 18–20 depict how gratings having multiple dimensions may have different optical properties relative to each such dimension.

FIG. 11 depicts the structure and operation of a 1D or linear grating 500 (e.g., any of the variations of the Bragg grating 100 already discussed). The linear grating 500 is made of at least two different transparent materials. One of these serves as a background material 502 and one or more others are interlayer materials, with multiple regions of one interlayer material 504 represented here.

The diffraction efficiency in the linear grating 500 depends on the effective refractive index of the particular interlayer material 504 and the background material 502. The simplest case is depicted in FIG. 11, where just two materials are employed having refractive indices of $n_1$ and $n_2$. The background material 502 can have either $n_1$ or $n_2$, depending on manufacturing convenience, and here it has arbitrarily been made $n_1$.

The regions of the interlayer material 504 ($n_2$) are provided with a thickness 506 such that the phase difference between the reflecting portions of a light beam from both surfaces of a region are multiples of 360 degrees. This insures that constructive interference for a specific wavelength can occur. A similar rational, achieving constructive interference, applies to providing a separation 508 between the regions of the interlayer material 504.

In operation, a light beam 510 may be directed into the linear grating 500, as shown in FIG. 11, to form a reflected beam 512 (shown here skewed for emphasis) and a passed beam 514. The reflected beam 512 will contain the light of the specific wavelength for which constructive interference occurs, and the passed beam 514 will contain all other wavelengths. Thus, the linear grating 500 can be used as a filter to obtain light of high wavelength purity. Alternately, in the manner of prior art gratings, the thicknesses 506 and the separations 508 of the regions of the interlayer material 504 may be varied to "chirp" the linear grating 500 and thereby broaden the reflected beam 512 to include a range of wavelengths.

FIG. 12 is a stylized perspective view showing that the principles of the linear grating 500 of FIG. 11 can be extended to a 2D or planar grating 600. The planar grating 600 has a background 602 containing a grid of cells 604. The background 602 has a refractive index, say, $n_1$, and the cells 604 have at least one different refractive index. For simplicity in this discussion, the cells 604 are all of the same material and refractive index, say, $n_2$.

In FIG. 12 an XYZ-axes icon 606 shows a standard Cartesian reference scheme used to facilitate this discussion. The cells 604 have a respective thickness 608 and separation 610 along the X-axis, and also a respective thickness 612 and separation 614 along the Y-axis. These can be chosen in much the same manner as the thickness 506 and the separation 508 of the linear grating 500. Furthermore, if desired, the respective sets of these may be chosen to be different, to obtain constructive interference for different specific wavelengths (discussed in more detail, presently).

FIG. 12 also includes stylized representations of a light beam 616, a diffracted beam 618, and a passed beam 620, to depict how the planar grating 600 employs constructive interference in the XY-plane. The light beam 616 may contain a number of light wavelengths, including one which meets the Bragg condition for the thicknesses 608, 612, separations 610, 614, and refractive indices here. The diffracted beam 618 will then contain only light of the wavelength meeting the Bragg condition provided for, while the passed beam 620 will contain the other wavelengths present.

FIG. 13 is a stylized perspective view showing that the principles of the linear grating 500 and the planar grating 600 can be further extended to a 3D or cubical grating 700. The cubical grating 700 has a background 702 containing a grid of cells 704. The background 702 has a particular refractive index and the cells 704 have one or more other refractive indices. For simplicity, the cells 704 here are all of the same material.

In FIG. 13 an XYZ-axes icon 706 shows a standard Cartesian reference scheme used to facilitate this discussion The cells 704 have respective thicknesses along the X-axis, Y-axis, and Z-axis, and also respective separations along each of these axes. If desired, these respective dimension sets may also be chosen to be different, to obtain constructive interference for different specific wavelengths. That is the case here and two of the three possible sets of thicknesses and separations have been chosen to be different.

FIG. 13 also includes stylized representations of a light beam 708, a first diffracted beam 710, a second diffracted beam 712, and a passed beam 714. The cubical grating 700 here employs one condition of constructive interference in the XY-plane as well as a second condition of constructive interference in the ZX-plane. The light beam 708 may contain a number of light wavelengths, including two which meet the respective Bragg conditions designed for here. The first diffracted beam 710 will thus contain the light wavelength subject to diffraction in the XY-plane, the second diffracted beam 712 will thus contain the light wavelength subject to diffraction in the YZ-plane, and the passed beam 714 will contain the other wavelengths. This is now explained in further detail in a coverage of the principles underlying the inventive planar grating 600 and the inventive cubical grating 700.

Figure 14:
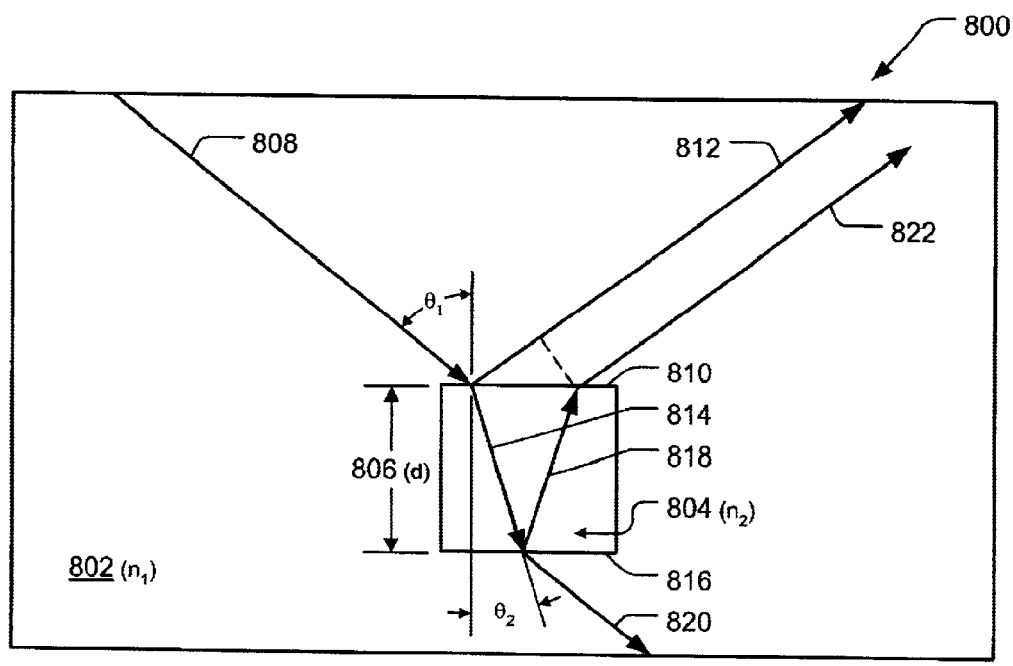
FIG. 14 is a schematic representation of surface-to-surface or intra-cell refraction effects in a grating.

Turning now to derivations of how the principles in one dimension extend to multiple dimensions, FIG. 14 illustrates cell interference (based on intra-cell refraction) in a generic grating 800. A background 802 is provided having a refractive index $n_1$, and is shown here with a single cell 804 (potentially one of many which may be present in embodiments of planar or cubical gratings according to the present invention). The cell 80 is of a material having a different refractive index, $n_2$, and it has a thickness 806(d).

When a light beam 808 (carrying a wavelength $\lambda$) travels through the background 802 (medium $n_1$) and shines on a first surface 810 of the cell 804 at an incidence angle $\theta_1$, a first reflected portion 812 (of the light beam 808) is produced and reflected from the cell 804, as shown. Concurrently, as similarly occurs in the linear grating, the rest of the light beam 808 transmits into the cell 804 (medium $n_2$) as a first refracted portion 814. This first refracted portion 814 is refracted at the first surface 810 according to the law of refraction, or Snell's law:

$$n_1 * \sin \theta_1 = n_2 * \sin \theta_2,$$

where $\theta_2$ is the refracted angle in the cell 804. The first refracted portion 814 then travels through the cell 804 until it encounters a second surface 816 of the cell 804, where part of it is reflected as a second reflected portion 818 and the rest exits the cell 804 as a transmitted portion 820.

The second reflected portion 818 travels back to the first surface 810, where it is refracted back into the background 802 as a second refracted portion 822. This second refracted portion 822 constructively interferes with the first reflected portion 812 if the thickness 806(d) and the refracted angle $\theta_2$ satisfy the condition (based on Bragg's law):

$$2*n_2*d*\cos \theta_2 = k*\lambda, \qquad \text{Eq. 1:}$$

where k is an integer.

The transmitted portion 820 simply exits the cell 804 and continues to propagate in the original direction of the light beam 808, potentially to encounter and interact with another cell, and repeat the phenomenon.

It follows that by design with proper values for $n_1$, $n_2$, d, and the incidence angle $\theta_1$, that portions of the light beam 808 can be made to constructively interfere and, in a grating constructed accordingly, the cells will behave like scatterers, to scatter light beams in a designated direction.

Figure 15:
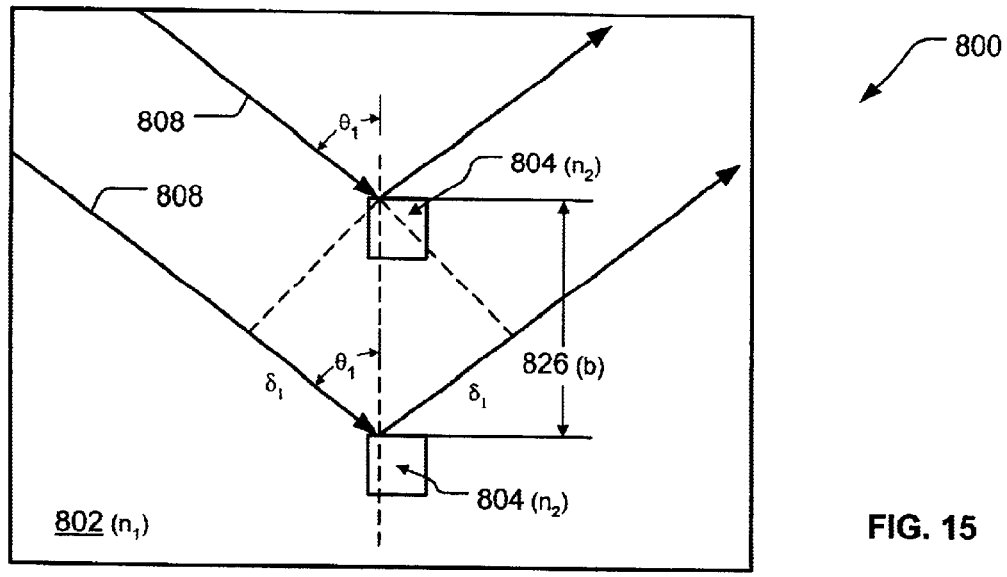
FIG. 15 is a schematic representation of cell-to-cell interference between two vertically adjacent cells in a grating.
Figure 16:
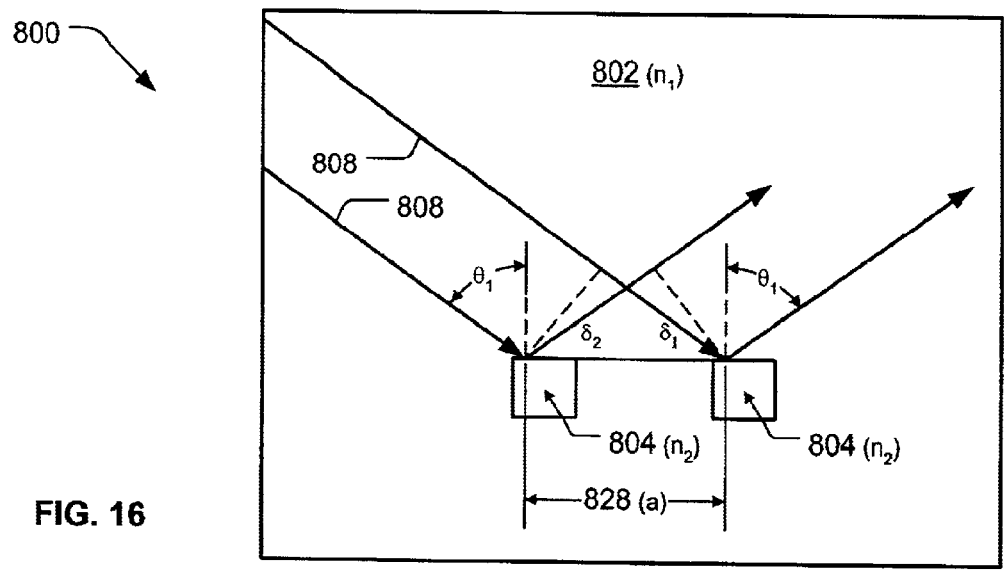
FIG. 16 is a schematic representation of cell-to-cell interference between two horizontally adjacent cells in a grating.

On the other hand, there also exists the possibility of cell-to-cell interference. In order to employ this to also achieve constructive interference between adjacent cells, certain conditions also have to be met. FIG. 15 depicts cell-to-cell interference between two vertically adjacent cells, and FIG. 16 depicts cell-to-cell interference between two horizontally adjacent cells.

Turning first to FIG. 15, it depicts the generic grating 800, again, with the background 802, but now containing a lattice of two of the cells 804 which are vertically aligned. The reflected intensity will be maximum if the optical path difference ($OPD_v$) between the cells 804 meets the condition:

$$OPD_v = 2*\delta_1 = 2*n_1*b*\cos \theta_1 = m*\lambda,$$

where $\delta_1$ is the distance shown, b is a vertical separation 826 between the two adjacent cells, and m is an integer.

Turning next to FIG. 16, it similarly depicts the generic grating 800, only now with the background 802 containing a lattice of two of the cells 804 which are horizontally aligned. The reflected intensity here will be maximum if the optical path difference ($OPD_h$) between the cells 804 meets the condition:

$$OPD_h = \delta_1 - \delta_2 = 2*n_1*a*\sin \theta_1 = 1*\lambda,$$

where $\delta_1$ and $\delta_2$ are the distances shown, a is a horizontal separation 828 between the two adjacent cells, and 1 is an integer.

Figure 17:
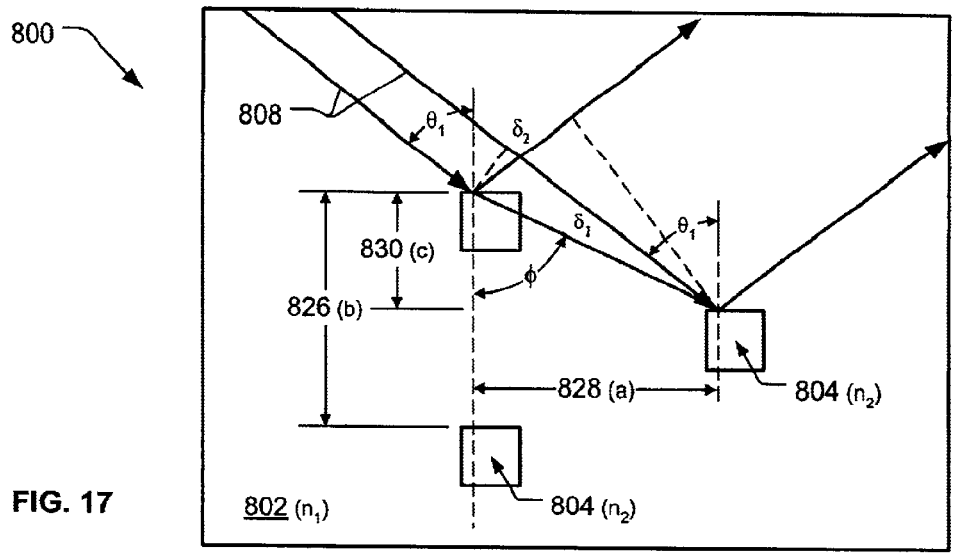
FIG. 17 is a schematic representation of general cell-to-cell interference, wherein a grating contains three cells two in adjacent columns.

FIG. 17 depicts a general case for cell-to-cell interference, wherein the generic grating 800 now contains three cells 804, in adjacent columns. The reflected intensity will be maximum if the optical path difference (OPD) between these cells 804 meets the condition:

$$OPD = \delta_1 - \delta_2 = 2*n_1*(a^2+c^2)^{1/2}*\cos(\phi-\theta_1) = m*\lambda, \qquad \text{Eq. 2:}$$

where $\delta_1$ and $\delta_2$ are the distances shown, a is the horizontal separation 828 between two adjacent cells, b is the vertical separation 826 between the two adjacent cells, c=is a vertical separation 830 between two cells in adjacent columns, $\phi$ is the angle shown (essentially, a measure of cell-to-cell disalignment relative to the incidence surfaces), $\theta_1$ is the angle of light beam incidence, and m is an integer.

FIG. 18 depicts the general case of FIG. 17 extended to operate two dimensionally, on two wavelengths by using non symmetrical relationships in a grating 850. A background 852 (having refractive index $n_1$) here contains three cells 854 (having refractive index $n_2$). The cells 854 have a horizontal thickness 856(x), a vertical thickness 858(y), a horizontal separation 860(a), a first vertical separation 862 (e), and a second vertical separation 864(f). A light beam, stylistically represented as first portions 866 having a first wavelength $\lambda_1$ and second portions 868 having a second wavelength $\lambda_2$, approaches the cells 854. The first portions 866 are then scattered as shown if Eq. 2 is satisfied with respect to $\theta_1$. Similarly, the second portions 868) are scattered as shown if Eq. 2 is satisfied with respect to $\theta_2$.

FIG. 19 is a diagram of the grating 850 of FIG. 18 as it might typically be applied in an actual planar or cubical grating according to the present invention. Since the "pitch" of each grating cell-surface determines a "resonance" wavelength, by varying the pitch and the cell spacing in a two-dimensional grating an incoming multiple-wavelength laser beam can be sorted into single-wavelength beams in a spatial domain. Since the parameters of each individual grating unit can be made accurately with semiconductor-like manufacturing process, the directions of each single-wavelength laser beam can be made parallel, for use in ultimate applications.

FIG. 20 is a perspective view of a three-dimensional (3D) grating 880. In the grating 880 a background material (not shown, but of a material having refractive index $n_1$) contains non symmetrical cubic cells 882 (of a material having refractive index $n_2$). An incoming light beam including three wavelengths $\lambda_1$, $\lambda_2$, $\lambda_3$, stylistically represented as first portions 884, second portions 886, and third portions 888, is incident to the cells 882 on their surfaces. With respect to each of the three different incident surfaces and opposed surface sets, the cells 882 each behave like a "scatterer" according to Eq. 1 and 2, above.

Firstly, with respect to Eq. 1, the light wavelengths are each respectively scattered by a different set of opposite surfaces if:

$$2*n_2*d_i*\cos\theta_i = m_i*\lambda_i,$$

where $d_i$ is the respective cell thickness perpendicular to the "scattering" surface, $\theta_i$ is the respective refracted angle inside the cell, and $m_i$ is an integer respectively in each dimension. In fact, $\lambda_i$ can be viewed as the "inter-cell resonant wavelength" for opposite cell surfaces optically separated by $d_i$.

Secondly, with respect to Eq. 2, the light wavelengths are each respectively scattered by a different incident surface if:

$$OPD_i = 2*n_1*a_i*\cos(\phi_{i-\theta i}) = m_i*\lambda_i,$$

where $OPD_i$ is the optical path difference between the cell-to-cell incident surfaces, $a_i$ is the cell-to-cell separation, $\phi_i$ is the angle of cell-to-cell dis-alignment (relative to the incidence surfaces), $\theta_i$ is the angle of light beam incidence to the incidence surfaces, and $m_i$ is an integer.

There are a number of factors which provide the present invention with its novel abilities. For constructing the invention, these may be tailored individually or collectively, and the following, without limitation, now discusses some of these factors.

The background material's index of refraction ($n_1$) can be considered by itself. While many embodiments will intentionally keep this constant throughout the grating, it can also be controlled to craft sophisticated embodiments of the invention. Using micro-fabrication techniques it is a simple matter to make different regions of the background material have different indices of refraction. Conceptually, this is can be viewed as constructing a number of contiguous gratings. It is useful to work with multiple light wavelengths in the gratings. More complex micro-fabrication techniques, however, also permit making all, or one or more parts, of the background material have indices of refraction which vary. For instance, a gradient can be imposed by controlled doping during grating fabrication. This permits constructing gratings that work with a range of light wavelengths (somewhat analogous in effect to conventional chirped gratings).

In multi-dimensional contexts such a gradient need not extend merely in a single-dimensional, lengthwise manner, like the light beam 510 progressing through the liner grating 500 in FIG. 11. For example, if the index of refraction were varied from, say, the top-left corner to the bottom-right corner in the linear grating 850 in FIG. 19, the first portions 866 ($\lambda_1$) and the second portions 868 ($\lambda_2$) would both contain broadened wavelength response (i.e., each be "chirped"). Similarly, if the index of refraction were varied from corner to corner in the cubical grating 880 of FIG. 20, the three respective portions 884, 886, 888 ($\lambda_1$, $\lambda_2$, $\lambda_3$) there would each be wavelength broadened.

Next the cell material's index of refraction ($n_2$) can be considered by itself. Again, sophisticated embodiments of the invention can be constructed by working with the index of the material here. Constructing the cells using different single-index materials permits making gratings that work with multiple light wavelengths. Here that capability can be also particularly well integrated into the grating as a whole. FIG. 12 and the planar grating 600 depicted there can help illustrate this. The right-most cells 604 might have index $n_{2a}$, the middle-most cells have a different index $n_{2b}$, the left-most cells again have index $n_{2a}$, (and so forth in the many, many "layers" in most practical embodiments). The diffracted beam 618 will then contain two wavelengths, ($\lambda_a$, $\lambda_b$). Alternately, the cells 604 by index ($n_{2a}$, $n_{2b}$) can be arranged other than by layers. They can even be placed randomly. The ratio of cells 604 having index $n_{2a}$ to those having index $n_{2b}$ can also be varied, to "strongly" separate one wavelength (say, $\lambda_a$) and less completely extract the other ($\lambda_b$). Of course, the invention is not limited to just cells having two indices ($n_{2a}$, $n_{2b}$); a third ($n_{2c}$), fourth ($n_{2d}$), etc. are possible as well. Similarly, once the concept is grasped for two-dimensions, it follows that it can be also be employed in three (consider FIG. 13 and the cubical grating 700 there).

Constructing the cells using internally varying material indices is also possible. This is another way to construct gratings that work with ranges of light wavelengths (again, somewhat analogous in effect to conventional chirped gratings, but here potentially with respect to each grating-dimension).

Next consider the background and cell material's indices of refraction together ($n_1$ and $n_2$). These two indices may be viewed as one factor, an "effective index" or "relative index" that effects the overall efficiency of the grating. Additionally, these indices can be worked with to facilitate construction. If one material (say, $n_2$) is hard to hold constant or to vary the characteristics of during grating fabrication, the other ($n_1$) can be worked with instead. It should also be noted that $n_1 < n_2$ or $n_1 > n_2$ can be used.

The surface-to-surface dimensions of the cells can also be considered If the cells are made very small, comparable to the wavelength of the light source. Then the surface-to-surface dimensions are not a factor and Bragg's law can apply directly. Alternately, as has been shown above, the cells can be made larger. In this case, Bragg's law can still apply if one or more cell "thickness" is made so that the reflected waves constructively interfere.

As shown in FIG. 14, 18, and 20, the cells can have one, two, or even three different thickness, to effect a corresponding number of light wavelengths differently. Furthermore, in sophisticated embodiments these respective cell thickness can intentionally be different. To help appreciate this further, reconsider the above discussion about varying cell index of refraction. Cell to cell variation can be employed. Finite sets or ranges of thicknesses for the different cells can be used; the cells so constructed can be placed in layers, another ordering, or randomly; and the proportions between the different cells can be equal or otherwise, to purposely work more or less strongly with particular light wavelengths.

The cell-to-cell spacings can likewise be considered. As shown in FIG. 15, the row-to-row placement of the cells can be controlled (to achieve uniformity or intentional forms of "non-uniformity," like the examples noted above). Similarly, as shown in FIG. 16, the column-to-column placement of the cells can be controlled (again for uniformity or intentional non-uniformity). Furthermore, however, as shown in FIG. 17, the cell-to-cell placement can be asymmetric. Either row-to-row asymmetry, column-to-column asymmetry, or both can be used. Still further, although semantically somewhat an oxymoron, this asymmetry can be uniform or non-uniform. For example, any or all of the separations 826, 828, 830 can be held constant or varied.

The cell quantity present is also a factor meriting consideration. If a large grating with may cells is cut into slices, Bragg's law holds for each. If only two rows, columns, etc. of cells are involved, the transition from constructive to destructive interference is quite gradual. In contrast, if many cells are present, the constructive interference will peak very sharply, with mostly destructive interference in between the peak wavelengths. In fact, this sharpening of the peaks is very similar to the sharpening of diffraction peaks from a diffraction grating as the number of slits increases. Of course, cutting large gratings to produce multiple smaller ones also has obvious manufacturing utility.

It should be noted that the examples in the figures herein have shown single gratings with no external components. In use there will, of course, be conventional external components such as a laser light source, and typically much more. Furthermore, in suitable applications considerable benefit can be obtained by using multiple gratings and other components together. One of the particular strengths of micro fabrication type processes, as used by the present invention, is that they can be used to construct large numbers and varieties of components concurrently. Such products can then be used either in operational combination or separately. Thus, for example, multiple linear gratings 500, planar gratings 600, or cubical gratings 700 can be constructed together in a linear or other operational arrangement, using different lattice dimensions, doping, etc. to work with different light wavelengths. If desired, other electrical and micro-mechanical components can also be constructed in the same substrate or in the same layer materials, e.g., one or more electro-optical sensors or micro mirrors. The present invention is thus very highly integrateable with IC and MEMS technology.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present invention is well suited for application in the production of linear, planar, and cubical optical gratings, with the latter, multi-dimensional types being particularly novel and exhibiting potential for application in manners heretofore not possible in the arts The invention may be produced using processes common in mature arts like semiconductor manufacturing. For example, micro fabrication process such as photolithography, etching, thin film deposition, doping, stripping, thermal annealing, chemical mechanical polishing (CMP), planarization, etc., which are common in the production of electronic integrated circuits and micro electromechanical systems, may now also be used to produce the inventive optical gratings in or atop substrate materials such as glass plate or silicon wafer.

These mass-production process well produce miniature devices with great accuracy, as the two common examples of 256 MB DRAM and high-speed microprocessors illustrate. Such semiconductor type manufacturing process have an amazing dimension control, being able to readily produce devices with line widths as small as 0.1 micron and trench depths of 10 microns. As has been described, above, these semiconductor-type process also allow gratings to be made in a single dimension, two dimensions, and even three dimensions.

Accordingly, the invention may employ the many benefits of such generally accepted technology in a field where such are highly desired. The invention provides a marked departure from traditional and fiber-based optical grating technology known today, and particularly from conventional Bragg grating technology. In particular, compared to prior grating technologies, the invention is low cost. The inventive gratings can be economically mass-produced, like integrated circuits presently are.

The inventive gratings may be made very compact, and thus they can be easily attached to optical fibers or laser light sources directly. This avoids much of the awkwardness of handling and interfacing, and poor robustness of traditional gratings. Furthermore, the inventive gratings may be highly durable, and thus able to survive broader temperature and humidity ranges than conventional fiber-type Bragg gratings. The inventive gratings are also absolute devices, and since the dimensions are very accurately made, the absolute wavelength that is in "resonance" with the pitch of the grating can be known immediately. As has also been described, the semiconductor-type process used also allow the present inventive gratings to be very highly integrateable with IC and MEMS technology, to construct larger useful systems.

For the above, and other reasons, it is expected that the process and products of the present invention will have widespread industrial applicability. Therefore, it is expected that the commercial utility of the present invention will be extensive and long lasting.

What is claimed is:

1. An optical interference grating, comprising:

a background region of a first material having a first refractive index;

a grid of cells within said background region wherein said cells are of a second material having a second refractive index;

a plurality of said cells each having at least one incident surface;

said plurality of said cells also each having opposed surfaces, respective to said incident surfaces;

said incident surfaces are pitched such that, when the optical interference grating receives a light beam, first portions thereof may strike said incident surfaces, enter said cell, travel to said opposed surfaces, be reflected there from, travel back to said incident surfaces, and exit said cell as refracted beams; and said arid of cells is optically two-dimensional by virtue of said cells having at least two of cell-to-cell and surface-to-surface optical separations such that said reflected beams will constructively interfere for a predetermined light wavelength when it is present in said light beam.

2. The optical interference grating of claim 1, wherein said at least one incident surfaces are additionally pitched such that, when the optical interference grating receives said light beam, second portions thereof may strike said incident surfaces and be reflected there from as reflected beams.

3. The optical interference grating of claim 2, wherein said plurality of said cells have cell-to-cell separations such that said reflected beams will constructively interfere for a pre-determined light wavelength when it is present in said light beam.

4. The optical interference grating of claim 1, wherein said at least one incident surface and respective opposed surface have surface-to-surface optical separations such that said reflected beam and said refracted beam will constructively interfere for a light wavelength when it is present in said light beam.

5. The optical interference grating of claim 4, wherein said plurality of said cells have cell-to-cell separations such that said reflected beams will also constructively interfere for said light wavelength.

6. The optical interference grating of claim 1, wherein:
said cells have a first set of surface-to-surface separations and a first set of cell-to-cell separations such that constructive interference will occur for a first light wavelength when it is present in a light beam.

7. The optical interference grating claim 6, wherein said cells further have a second set of surface-to-surface separations and a second set of cell-to-cell separations such that constructive interference will occur for a second light wavelength when it is present in said light beam.

8. The optical interference grating of claim 1, wherein said cells have a first set and a second set of surface-to-surface separations and a first set and a second set of cell-to-cell separations such that constructive interference will occur for a first light wavelength and a second light wavelength when it is present in said light beam.

9. The optical interference grating of claim 8, wherein said cells further have a third set of surface-to-surface separations and a third set of cell-to-cell separations such that constructive interference will occur for a third light wavelength when it is present in said light beam.

10. The optical interference grating of claim 1, wherein said grid of cells have at least one set of surface-to-surface separations and cell-to-cell separations based on Bragg's law for a specific light wavelength.

11. The optical interference grating of claim 1, wherein said first material and said second material are members of the set of consisting of silicon wafer, glass, amorphous silicon-hydrate (SiH, SiH2, SiH3, SiH4), Si, Ge, GaAs, SiO2, Al2O3, MgF2, B, P, ZnSe, ZnS, GaP, SrTiO3, InSb, YSZ, AlAs, BaTiO3, BiSiO20, Bi12GeO20, AlN, BN, AgGaS2, LiTaO3, CuCaS2, TlI, TlCl, TlBr, AgCl , AgBr, AgI, AgGaSe2, and KnbO3.

12. The optical interference grating of claim 1, wherein said first material and said second material are of a same base material and at least one is altered by doping with an impurity to distinguish said first refractive index from said second refractive index.

13. A method for fabricating a optical interference grating, the method comprising the steps of:
(a) providing a background region of a first material having a first refractive index;

(b) providing a grid of cells within said background region, wherein said cells are of a second material having a second refractive index;

(c) providing a plurality of said cells each having at least one incident surface, wherein said plurality of said cells also each have opposed surfaces, respective to said incident surfaces and said incident surfaces are pitched such that, when the optical interference grating receives a light beam, first portions thereof may strike said incident surfaces, enter said cell, travel to said opposed surfaces, be reflected there from, travel back to said incident surfaces, and exit said cell as refracted beams; and wherein said arid of cells is optically active in two-dimensions by virtue of said cells having at least two of cell-to-cell and surface-to-surface optical separations such that said reflected beams will constructively interfere for a pre-determined light wavelength when it is present in said light beam.

14. The method of claim 13, wherein said step (a) includes defining a portion of a substrate inherently having said first refractive index to be said background region.

15. The method of claim 13, wherein said step (a) includes altering a portion of a substrate by doping with an impurity to impart said background region with said first refractive index.

16. The method of claim 15, wherein said step (a) includes doping with said impurity such that said first refractive index has a gradient.

17. The method of claim 16, wherein said step (a) includes imparting said gradient by controlling temperature.

18. The method of claim 13, wherein said step (b) includes providing said cells with said second material such that said second refractive index varies along a gradient.

19. The method of claim 13, wherein said step (b) further includes providing said cells with a first set of surface-to-surface separations and cell-to-cell separations such that constructive interference will occur for a first light wavelength when it is present in a light beam entering the optical interference grating.

20. The method of claim 19, wherein said step (b) further includes providing said cells with a second set of surface-to-surface separations and cell-to-cell separations such that constructive interference will occur for a second light wavelength when it is present in said light beam.

21. The method of claim 13, wherein said step (b) includes providing said cells with a first set and a second set of surface-to-surface separations and cell-to-cell separations such that constructive interference will occur for a first light wavelength and a second light wavelength when it is present in said light bean.

22. The method of claim 21, wherein said step (b) further includes providing said cells with a third set of surface-to-surface separations and cell-to-cell separations such that constructive interference will occur for a third light wavelength when it is present in said light beam.

* * * * *